(12) United States Patent
Paran et al.

(10) Patent No.: US 11,514,478 B1
(45) Date of Patent: Nov. 29, 2022

(54) SYSTEM, METHOD, AND COMPUTER PROGRAM FOR REAL-TIME BIDDING (RTB) FOR SERVING ADVERTISEMENTS FROM EDGE STORAGE

(71) Applicant: Amdocs Development Limited, Limassol (CY)

(72) Inventors: Eran Yosef Paran, Hod Hasharon (IL); Shmuel Ur, Shorashim (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 216 days.

(21) Appl. No.: 16/010,330

(22) Filed: Jun. 15, 2018

(51) Int. Cl.
*G06Q 30/02* (2012.01)

(52) U.S. Cl.
CPC ..... *G06Q 30/0275* (2013.01); *G06Q 30/0277* (2013.01)

(58) Field of Classification Search
CPC ........................................ G06Q 30/0207–0277
See application file for complete search history.

(56) References Cited

U.S. PATENT DOCUMENTS

| | | | | |
|---|---|---|---|---|
| 8,918,088 | B1 * | 12/2014 | Thodupunoori | H04H 60/44 455/414.2 |
| 9,674,567 | B1 * | 6/2017 | Carter | H04N 21/812 |
| 11,392,995 | B2 * | 7/2022 | Ashner | H04L 67/1001 |
| 2013/0238751 | A1 * | 9/2013 | Raleigh | H04L 67/562 709/217 |
| 2013/0246311 | A1 * | 9/2013 | Lee | G06Q 30/0207 705/400 |
| 2014/0058848 | A1 * | 2/2014 | Jian | G06Q 30/0275 705/14.71 |
| 2016/0180377 | A1 * | 6/2016 | Kang | G06Q 30/0249 705/14.43 |
| 2017/0178193 | A1 * | 6/2017 | Jagannath | G06Q 30/04 |
| 2019/0130437 | A1 * | 5/2019 | Gao | G06N 7/005 |

* cited by examiner

*Primary Examiner* — Chrystina E Zelaskiewicz
(74) *Attorney, Agent, or Firm* — Zilka-Kotab, P.C.

(57) ABSTRACT

A method of serving Real Time Bidding (RTB) requests received from client devices based on availability of advertisements (ADs) at an edge storage, comprising using an RTB server for receiving RTB request(s) from one or more client devices for impression(s) in AD placement(s) offered by online content presented by the client device(s) to associated user(s), forwarding the RTB request(s) to AD exchange(s) and receiving in response a plurality of bid offers received from advertisers for purchasing the impression(s) for posting a plurality of ADs, identifying among the plurality of ADs cached AD(s) stored at an edge storage located at an edge of a network serving the client device(s), adjusting bid offers relating to non-cached ADs to reflect cost of network resources required for downloading the non-cached AD(s) and initiating service of AD(s) associated with highest bid offer(s) among the adjusted bid offers and bid offers relating to the cached AD(s).

8 Claims, 7 Drawing Sheets

SYSTEM, METHOD, AND COMPUTER PROGRAM FOR REAL-TIME BIDDING (RTB) FOR SERVING ADVERTISEMENTS FROM EDGE STORAGE

BACKGROUND

The present invention, in some embodiments thereof, relates to serving advertisements (ADs) to client devices in response to real time bidding (RTB) requests, and, more specifically, but not exclusively, to serving ADs to client devices from edge storage in response to RTB requests.

Online advertisement has long become one of the main advertisement channels and often considered the most effective channel.

In order to effectively target advertisement (ADs) for specific users in real time highly sophisticated and complex platforms have be constructed based on advanced algorithms which are constantly evolving.

A key element in the real time advertisement trade is Real Time Bidding (RTB) in which publishers of online content offer for sale impressions at AD placements embedded in the online content. The impression sale offers designated RTB requests may be transmitted by automated platforms associated with the publishers, for example, a Supply Side Platform (SSP) and/or the like to one or more AD exchanges. The AD exchanges may conduct AD auctions in real time by distributing the RTB requests to a plurality of automated platforms associated with a plurality of advertisers, for example, a Demand Side Platform (DSP) and/or the like. In response the AD exchange may receive from the DSPs a plurality of bid offers for the RTB requests and may select a highest bidding offer. The AD associated with the highest bidding offer may then be served at the respective AD placements for which the RTB requests were issued.

SUMMARY

According to a first aspect of the present invention there is provided a computer implemented method of preloading cached advertisements (ADs) to an edge storage, comprising using one or more processor of an Real Time Bidding (RTB) server, the processor(s) is adapted for:

Identifying one or more event attributes of one or more future events. The one or more attributes is a member of a group consisting of: an attribute of the one or more future events and a user attribute of one or more users estimated to participate in the one or more events;

Selecting a subset of cached ADs from a plurality of ADs available from a plurality of advertisers according to an analysis of the one or more event attributes.

Preloading the subset of cached ADs to an edge storage located at an edge of the network serving a plurality of client devices located at an edge of a network providing network service at a geographical location of the one or more future events to make the subset of cached ADs locally available for service to at least some of a plurality of client devices during the one or more future events.

Preloading the cached ADs to the edge storage may significantly reduce the network resources cost since the AD(s) may be preloaded prior to the future event while the network costs may be relatively low compared to the network resources cost during the future event. Selecting the cached ADs according to the event attributes and preloading them into the edge storage device(s) may significantly improve effectiveness in targeting the user(s) estimated to participate in the future event(s) and may hence significantly increase the probability that the cached ADs will be selected for service to the client devices and presented to the users during the future event(s). Efficiently targeting the users estimated to participate in the future event may further increase the probability that the cached ADs are actually converted (e.g. viewed, clicked, lead to a purchase, etc.) during the future event.

According to a second aspect of the present invention there is provided a computer implemented method of serving Real Time Bidding (RTB) requests received from client devices based on availability of advertisements (ADs) at an edge storage, comprising using one or more processors of an RTB server, the processor(s) is adapted for:

Receiving, via a network, one or more RTB requests from one or more client devices for an impression in one or more AD placements offered by online content presented by the one or more client devices to associated user(s).

Forwarding the one or more RTB requests to one or more AD exchanges.

Receiving from the one or more AD exchanges a plurality of bid offers received from a plurality of advertisers for purchasing the impression to post a plurality of ADs.

Identifying in real-time one or more of the plurality of ADs is a cached AD stored at an edge storage located at an edge of the network serving the one or more client devices.

Adjusting each of the plurality of bid offers relating to a respective non-cached AD of the plurality of ADs to reflect a cost of network resources required for downloading the respective non-cached AD to the one or more client devices.

Initiating service, to the one or more client devices, of one or more ADs associated with a highest bid offer among the plurality of adjusted bid offers and one or more of the plurality of bid offers relating to the one or more cached ADs.

According to a third aspect of the present invention there is provided a system for serving Real Time Bidding (RTB) requests received from client devices based on availability of advertisements (ADs) at an edge storage, comprising:

A storage storing a code; and

One or more processors of a RTB server coupled to the storage for executing the stored code, the code comprising:

Code instructions to receive, via a network, one or more RTB requests from one or more client devices for an impression in one or more AD placements offered by online content presented by the one or more client devices to associated user(s).

Code instructions to forward the one or more RTB requests to one or more AD exchanges.

Code instructions to receive from the one or more AD exchange a plurality of bid offers received from a plurality of advertisers for purchasing the impression to post a plurality of ADs.

Code instructions to identify in real-time one or more of the plurality of ADs is a cached AD stored at an edge storage located at an edge of the network serving the one or more client device.

Code instructions to adjust each of the plurality of bid offers relating to a respective non-cached AD of the plurality of ADs to reflect a cost of network resources required for downloading the respective non-cached AD to the one or more client device.

Code instructions to initiate service, to the one or more client device, of one or more AD associated with a highest bid offer among the plurality of adjusted bid offers and one or more of the plurality of bid offers relating to the one or more cached AD.

According to a fourth aspect of the present invention there is provided a computer implemented method of serving Real Time Bidding (RTB) requests received from a client device based on availability of advertisements (ADs) stored at the client device, comprising using one or more processor of an RTB server, the processor(s) is adapted for:

Receiving, via a network, one or more RTB request from one or more client device for an impression in one or more AD placement offered by online content presented by the one or more client device to an associated user.

Forwarding the one or more RTB request to one or more AD exchanges.

Receiving from the one or more AD exchanges a plurality of bid offers received from a plurality of advertisers for purchasing the impression to post a plurality of ADs.

Identifying in real-time one or more of the plurality of ADs is a cached AD locally stored by the one or more client devices.

Adjusting each of the plurality of bid offers relating to a respective non-cached AD of the plurality of ADs to reflect a cost of network resources required for downloading the respective non-cached AD to the one or more client devices.

Initiating service, to the one or more client devices, of one or more ADs associated with a highest bid offer among the plurality of adjusted bid offers and one or more of the plurality of bid offers relating to the one or more cached ADs.

Serving the cached AD(s) from the edge storage device(s) and/or from the local storage of the client device may significantly reduce the cost of network resources required for downloading the respective AD(s) from the origin remote network location. Moreover, since the cached AD(s) are served from the edge storage device(s) and/or from the storage of the client device, the latency in the service of a cached AD may be significantly lower compared to the latency of serving a similar AD from its origin remote network location. The reduced latency may significantly improve the user experience of the user presented with the AD. Furthermore, serving the cached AD(s) from the edge storage device(s) and/or from the local storage of the client device may be significantly more robust against networking effects, for example, network failure, network overload, network congestion, unavailability of the origin remote network location(s) and/or the like compared to the non-cached ADs which may be highly susceptible to such networking effects.

In a further implementation form of the first aspect, one or more of the users estimated to participate in the one or more future events are identified by analyzing attendance information indicative of an attendance of the at least user estimated to participate in the one or more future events. Identifying in advance the users estimated to participate in the future event according to the attendance information may allow extracting their user attribute(s) and may therefore improve efficiency of the selection of the cached ADs to optimally target the user(s) according to their user attributes.

In a further implementation form of the first aspect, each of the attributes of the future event(s) is a member of a group consisting of: a type of the one or more future events, a geographical location of the one or more future events, a timing of the one or more future events and a number of a plurality of users estimated to participate in the one or more future events. Using a wide range and variety of event attributes may significantly improve efficiency of the selection of the cached ADs to optimally target the user(s) estimated to participate in the future event according to their user attributes.

In a further implementation form of the first aspect, the user attribute of the user(s) estimated to participate in the one or more future events is a member of a group consisting of: an attribute of a client device associated with the one or more users, a personal attribute of the one or more users, a parameter of a service level agreement (SLA) of the associated client device, a browsing history of the one or more user and an online AD consumption history of the one or more users. Identifying the specific user attributes of the user(s) estimated to participate in the future event may further improve accuracy for targeting the selected cached ADs for the users.

In an optional implementation form of the first aspect, one or more of the subsets of cached ADs are selected according to an RTB emulation for prediction of bid offers associated with each of at least some of the plurality of ADs, the prediction is conducted by communicating with an automated bid offering system associated with at least some of the plurality of advertisers adapted to emulate a future RTB. Basing the selection of the cached ADs on bid offers as predicted by the advertiser(s) may significantly increase accuracy of the estimated RTB process and may therefore improve accuracy of selecting ADs that may best target the user(s) and hence potentially produce higher income due to higher AD conversion rate.

In an optional implementation form of the first aspect, one or more of the subsets of cached ADs are selected according to an RTB simulation of offering for sale a plurality of impressions for posting a plurality of ADs in a plurality of AD placements available in online content presented by one or more client devices to respective one or more users estimated to participate in the one or more future events, the RTB simulation is conducted to simulate the one or more events attribute of the one or more future event. Basing the selection of the cached ADs on simulated bid offers may significantly increase accuracy of the estimated RTB process and may further improve accuracy of selecting ADs that may best target the user(s) and hence potentially produce higher income due to higher AD conversion rate.

In an optional implementation form of the first aspect, the RTB simulation is conducted at a timing emulating a timing of the one or more future events. Conducting the RTB simulation at timing similar to the timing of the future event may significantly increase accuracy and/or integrity of the RTB simulating since one or more network resources parameters (e.g. bandwidth, congestion, latency, etc.) may be time dependent.

In an optional implementation form of the first aspect, one or more of the subsets of cached ADs are selected according to a prediction of availability and cost of networking resources required to download at least some of the plurality of ADs to the at least some client devices during the one or more future events. Since the network resources' cost may have a major impact on the selection of the cached ADs, predicting the availability of such network resources may allow more accurately and/or efficiently selecting the cached ADs.

In an optional implementation form of the first aspect, one or more of the subsets of cached ADs are selected based on analysis of online AD consumption detected during one or more previous events. This may further improve accuracy of selecting ADs that may best target the user(s) and hence potentially produce higher income due to higher AD conversion rate.

In an optional implementation form of the first aspect, one or more of the subsets of cached ADs are selected according to a relation of one or more of the plurality of advertisers to the one or more future events. This may provide an advantage to advertiser(s) involved in the future event over other advertisers.

In an optional implementation form of the first aspect, one or more of the subsets of cached ADs are selected according to a storage capacity of the edge storage. Since the capacity of the edge storage may be limited, optimizing the selection of ADs with respect to their volume (size) and their offered price may allow best storage utilization.

In an optional implementation form of the first aspect, one or more of the subsets of cached ADs are selected according to a prediction of which mobile applications will be executed by the at least some client devices during the one or more future events. This may further improve accuracy of selecting ADs that may best target the user(s) and hence potentially produce higher income due to higher AD conversion rate.

In an optional implementation form of the fourth aspect, one or more of the subsets of cached ADs are selected according to one or more parameters of one or more of the plurality of ADs, the one or more parameters is a member of a group consisting of: a type of the respective AD, an availability of the respective AD and a size of the respective AD. This may further improve storage utilization.

In an optional implementation form of the first aspect, a content of one or more cached ADs of the subset of cached ADs is adjusted to reflect a timing of the one or more future events. Since some of the ADs may include time elements which relate to a current time, therefore adjusting these time elements to match the future time of the future event may allow for accurate ADs presentation.

In an optional implementation form of the second, third and/or fourth aspects, the RTB request includes one or more user attributes of the associated user, the one or more user attributes are used by one or more of the plurality of advertisers to calculate a respective one of the plurality of bid offers for a respective one of the plurality of ADs, the one or more user attributes are members of a group consisting of: an attribute of the one or more client devices, a personal attribute of the associated user, a communication parameter of a service level agreement (SLA) of the one or more client devices, a browsing history of the associated user and an online AD consumption history of the associated user. Providing the user attributes in the RTB request may allow the advertiser to effectively target the users accordingly and hence may increase the ADs are actually converted.

In a further implementation form of the second, third and/or fourth aspects, the cost is calculated based on one or more parameters of the respective non-cached AD which is a member of a group consisting of: a type of the respective AD, an availability of the respective AD and a size of the respective AD. The cost of the network resources required for downloading an AD from its origin remote network may be directly dependent on the AD parameters and therefore calculating the network resources cost based on the AD parameters may significantly improve the calculation accuracy.

In an optional implementation form of the second, third and/or fourth aspects, one or more dominated non-cached ADs of the plurality of ADs are discarded. The dominated non-cached AD(s) is dominated by a dominant non-cached AD of the plurality of ADs having a smaller size and associated with a higher bid price. Removing the dominated ADs which will not be selected due to their lower offered price and larger AD size may reduce the number of (non-cached) ADs processed by the RTB server and may therefore reduce computing resources, for example, computing power, time, storage resources and/or the like.

In an optional implementation form of the second, third and/or fourth aspects, a Pareto frontier is calculated for the plurality of bid offers according to the cost of network resources and a size of each of the plurality of non-cached ADs. As the selection of the highest bid offer may depend on multiple variables, specifically the cost of the network resources per media unit (e.g. 1 MB) and the size of each of the non-cached ADs, and optimization using the Pareto frontier may be highly efficient.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

According to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL
VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DETAILED DESCRIPTION

Figure 1:
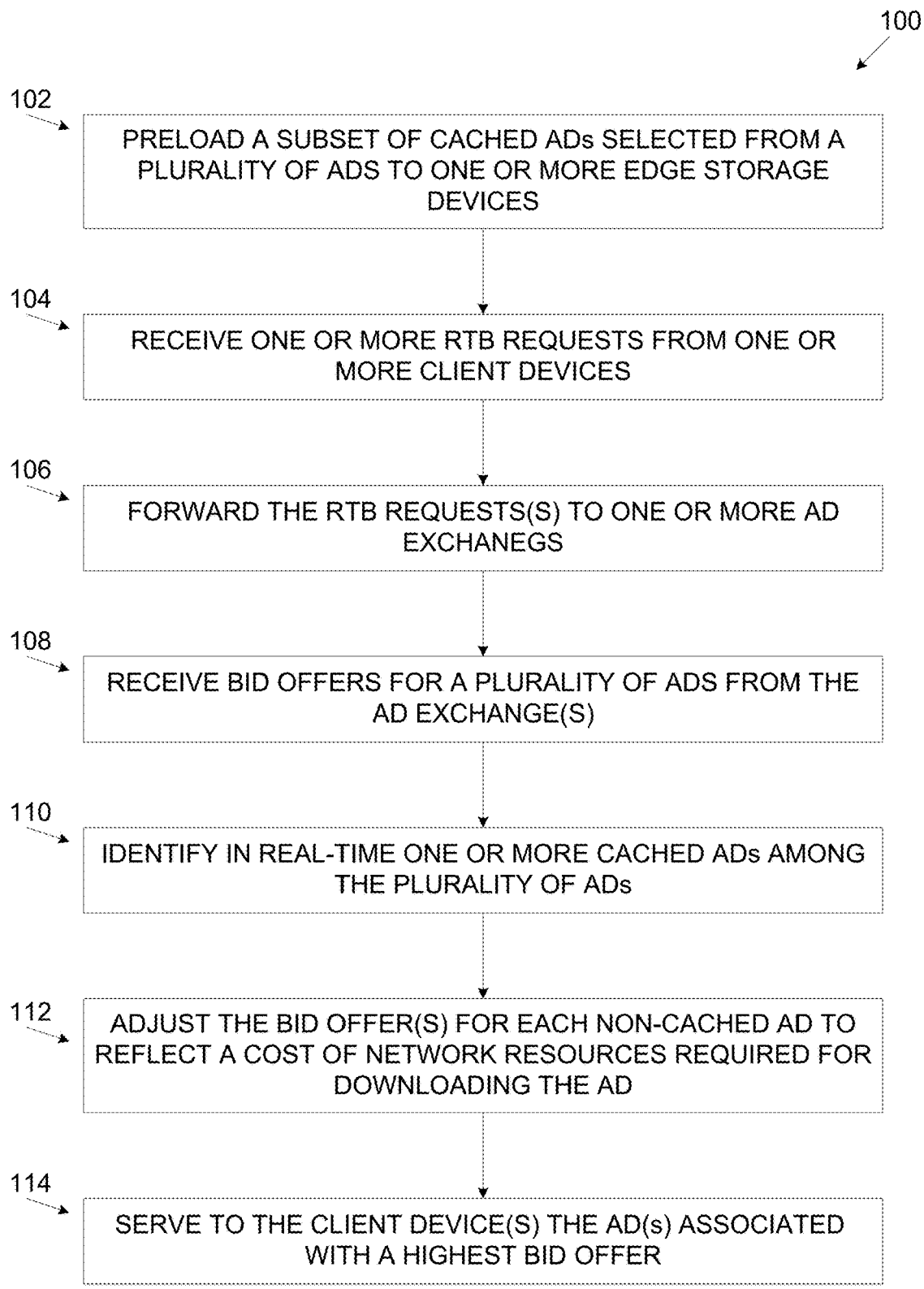
FIG. 1 is a flowchart of an exemplary process of serving ADs from edge storage in response to RTB requests received from client devices, according to some embodiments of the present invention.

The present invention, in some embodiments thereof, relates to serving advertisements (ADs) to client devices in response to real time bidding (RTB) requests, and, more specifically, but not exclusively, to serving ADs to client devices from edge storage in response to RTB requests.

According to some embodiments of the present invention, there are provided methods and systems for serving ADs to one or more client devices from edge storage in response to RTB requests received from the client device(s) offering impressions at one or more AD placements embedded in online content presented by the client device(s) to associated user(s). The client devices, for example, a cellular phone, a Smartphone, a tablet, a laptop, a desktop, a smart watch, smart glasses and/or the like may execute one or more AD consumption applications, for example, a web browser executing a webpage embedding the AD placement(s), a mobile application embedding the AD placement(s) and/or the like to present the online content to the associated user(s).

The RTB requests are forwarded to one or more AD exchanges and/or to one or more RTB platforms. In return a plurality of bid offers may be received from one or more advertisers, for example, from one or more automated systems associated with the advertiser(s) such as, for example, a demand side platform (DSP) and/or the like for purchasing the impressions to post respective ADs. One or more of the bid offers may be associated with cached ADs that are preloaded and locally stored (cached) at one or more edge storage devices located at an edge of a network serving the client device(s), i.e. in close network proximity to the client device(s). For example, one or more edge storage devices may be integrated and/or directly accessible by access point device(s) providing network connectivity to the client devices for connecting to one or more networks, for example, the internet. In another example, one or more edge storage devices may be accessible to the client device(s) through a local network, for example, a wireless network (e.g. Wi-Fi) and/or the like.

While some of the ADs are cached ADs that are locally available from the edge storage device(s) other ADs may be non-cached ADs which need to be downloaded to the client device(s) from their respective origin remote network locations, for example, the DSP, a media server, a cloud platform, a cloud storage and/or the like. Serving the non-cached ADs may therefore have a cost for the network resources, for example, a bandwidth and/or the like required to download the respective non-cached AD from the origin remote network location. The cost of the network resources associated with each AD is therefore directly dependent (proportional) on the size of the respective AD. The cached ADs on the other hand do not have such network resources cost since they are locally available for service to the client device from the edge storage device(s).

In order to select a highest bid offer among the bid offers received for the cached ADs and the non-cached ADs, the price offered by the bid offers associated with the non-cached ADs is adjusted to reflect the cost of the network resources required to deliver (download) the non-cached ADs to the client device(s). The bid offers associate with the cached ADs are naturally not adjusted as the cached ADs are locally available for service to the client device(s). The cost of the network resources required to download the cached ADs to the client device(s) is typically negligible and at any rate is similar for the network path of both the cached ADS and the non-cached ADs and is therefore disregarded.

For each of the RTB requests, one or more optimization techniques, for example, a Pareto frontier calculation may be applied in order to adjust the bid offers associated with the non-cached ADs based on the size of the respective ADs and the current cost of the network resources. A highest bid offer may then be selected from the Pareto frontier of the adjusted bid offers calculated for the non-cached ADs and the (not adjusted) bid offers associated with the cached AD(s).

The AD associated with the highest bid offer may then be served to the respective client device which issued the respective RTB request.

Serving cached ADs from the edge storage device(s) may present significant advantages and benefits compared to current systems and methods for serving ADs. First, the cost of the network resources required for downloading an AD from its origin remote network location may be significant and may typically be deducted from the price offered by the advertiser for the impression thus reducing the overall advertising income for the impression(s). Depending on the AD(s) size, the cost of the required network resources may be considerable thus reducing the overall income. During some time periods the costs of the network resources may be considerably high while during other time periods the network resources cost may be significantly lower. For example, network resources costs may be high during large venue events in which large numbers of users are located at the same time in a certain location deployed with a network infrastructure, specifically a wireless infrastructure having a given network capacity. However, the cost of the network resources may be significantly lower at one or more time periods prior to the event. Therefore, preloading the cached AD(s) to the edge storage device(s) during network resources low cost periods and serving the cached AD(s) from the edge storage device(s) at a later time (during which the network cost is typically high) may significantly reduce the cost of the network resource thus increasing the overall advertising income.

Moreover, since the cached AD(s) are served from the edge storage device(s) which at the edge of the network in proximity to the client device(s), the latency in the service of a cached AD may be significantly lower compared to the latency of serving a similar AD from its origin remote network location. The reduced latency may significantly improve the user experience of the user presented with the AD. This may be of particular interest during the large venue events since the multitude of users may simultaneously consume online content in particular online content embedding ADs which may lead to network congestion since the given network capacity of the onsite network infrastructure may be a bottleneck. Using the local edge resources, specifically the edge storage for serving the preloaded cached AD(s) from the local edge storage rather than fetching them from their origin remote network location may therefore overcome and potentially reduce the network congestion. This may further reduce the latency in serving the ADs which in turn may further improve the user experience.

Furthermore, serving the cached AD(s) from the edge storage device(s) may be significantly more robust against one or more networking effects, for example, a failure, an overload, unavailability of the origin remote network location(s) and/or the like compared to the non-cached ADs which may be highly susceptible to such networking effects.

According to some embodiments of the present invention, the one or more of the client devices utilize an RTB storage in their local storage comprising either persistent storage resource(s) and/or volatile storage resource(s). In such case one or more applications executed by the client device(s) to present the online content, in particular the ADs may be adapted to obtain data, specifically the cached ADs from their local storage. The AD consumption application may be designed, adapted, and/or configured to directly access the RTB storage location in the local storage and/or interact with one or more RTB storage applications adapted to access the RTB storage location. Serving the cached AD(s) from the local storage of the client device(s) may naturally present the same benefits as serving the cached AD(s) from the edge storage device(s) as the cached ADs may be readily available for service to the respective client device from the local storage.

According to some embodiments of the present invention, there are provided methods and systems for selecting ADs for caching (preloading) in the edge storage device(s) making the cached ADs available for service to the client device(s), specifically, available for service to the client device(s) for presentation to respective user(s) during a future event. In order to select ADs estimated to be most effective, relevant and/or appropriate for the user(s) estimated to participate in the future event(s), the cached ADs are selected according to an analysis of one or more event attributes identified for one or more future events.

The event attributes may include one or more attributes of the future event itself, user attributes of one or more users estimated to participate in the future event and/or the like. The attributes of the future event may include, for example, an event type, geographical location, a timing (e.g. time, date, duration, etc.), an estimated number of users estimated to participate in the future event and/or the like. The user attributes may include, for example, one or more attribute of the client device associated with a respective user (e.g. processor(s) type/speed, memory capacity, network type/ capacity, display size/resolution, etc.), a personal attribute of the respective user (e.g. gender, age, ethnic orientation, residence address, etc.), a parameter of a service level agreement (SLA) of the associated client device, a browsing history of the respective user, an online AD consumption history of the respective user and/or the like.

The event attributes are analyzed in order to identify characteristics of the future event itself as well as characteristics of the user(s) estimated to participate in the future event, for example, an occupation, an interest, a hobby and/or the like. A subset of ADs may be selected form a plurality of ADs from a plurality of advertiser to best target the characteristics of the future event and/or the characteristics of the user(s) estimated to participate in the future event.

The subset of selected ADs may then be preloaded (cached) to the edge storage device(s) making them cached ADs available for service during the future event(s) to one or more of the users participating in the future event(s).

Optionally, one or more cached ADs of the subset are selected based on an RTB simulation conducted at a time prior to the future event(s) and simulating an RTB process that is estimated to occur during the future event(s). In order to accurately simulate the RTB process as predicted for the future event(s), the RTB simulation may use event attributes similar to those identified for the future event(s). The bid offers received during the RTB simulation may be analyzed, for example, calculate the Pareto frontier for the received bid offers and select the highest bid offers accordingly. The RTB simulation may further be conducted during a time, for example, a day of the week, a time of the day, duration and/or the like as those identified for the future event(s) in order to accurately simulate the cost of the network resources.

Optionally, one or more cached ADs of the subset is selected based on an RTB emulation conducted at a time prior to the future event(s) for predicting bid offers estimated to be submitted during the future event(s). The RTB emulation is based on the ability of the advertisers, specifically the DSP(s) associated with the advertisers to respond to RTB requests directed to a future time. In order to accurately emulate the RTB process as predicted for the future event(s), the RTB emulation may use event attributes similar to those identified for the future event(s).

Optionally, one or more cached ADs of the subset is selected based on a prediction of the cost of the network resources required for downloading the respective AD(s) from their origin remote network location.

Optionally, one or more cached ADs of the subset are selected based on analysis of AD consumption during one or more previous events, specifically previous event(s) having similar event attributes.

Optionally, one or more cached ADs of the subset are selected based on a relation of one or more of the advertisers to the future event(s).

Optionally, one or more cached ADs of the subset are selected based on a storage capacity of the edge storage device(s).

Optionally, one or more cached ADs of the subset are selected based on a prediction of which application will be executed by the client devices during the future event(s).

Optionally, one or more cached ADs of the subset are selected according to one or more parameters of the AD(s), for example, type, availability, size and/or the like.

Selecting the cached ADs according to the event attributes and preloading them into the edge storage device(s) may present significant advantages and benefits. First, selecting the cached ADs that are estimated to most effectively target the user(s) estimated to participate in the future event(s) may significantly increase the probability that the cached ADs will be selected for service to the client devices and presented to the users during the future event(s). Accurately selecting the cached ADs and serving them from the local edge storage may overcome and potentially reduce network congestion for serving the AD(s) to the users during the future event as described herein before, in particular during large venues in which large numbers of users are located at the same time in a certain location deployed with a network infrastructure having a given network capacity which may therefore be highly congested. This may significantly reduce the latency in the service of a cached AD compared to the latency of serving a similar AD from its origin remote network location. The reduced latency may significantly improve the user experience of the user presented with the AD.

Moreover, the efficient targeting may significantly increase the probability that the cached ADs are converted (viewed, clicked, lead to a purchase, etc.) thus significantly increasing the advertising income for the impressions for AD placements embedded in their online content presented to the users.

Furthermore, selecting the cached ADs according to the RTB simulation, the RTB emulation and/or based an analysis of the AD consumption during the past event(s) may further improve the estimation accuracy of which ADs are estimated to best target the users estimated to participate in the future event(s).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of serving ADs from edge storage in response to RTB requests received from client devices, according to some embodiments of the present invention. An exemplary process 100 may be executed by an RTB server to serve ADs to one or more client devices in response to RTB requests received from the client device(s) offering impressions at one or more AD placements embedded in online content presented by the client device(s) to associated user(s).

Figure 2A:
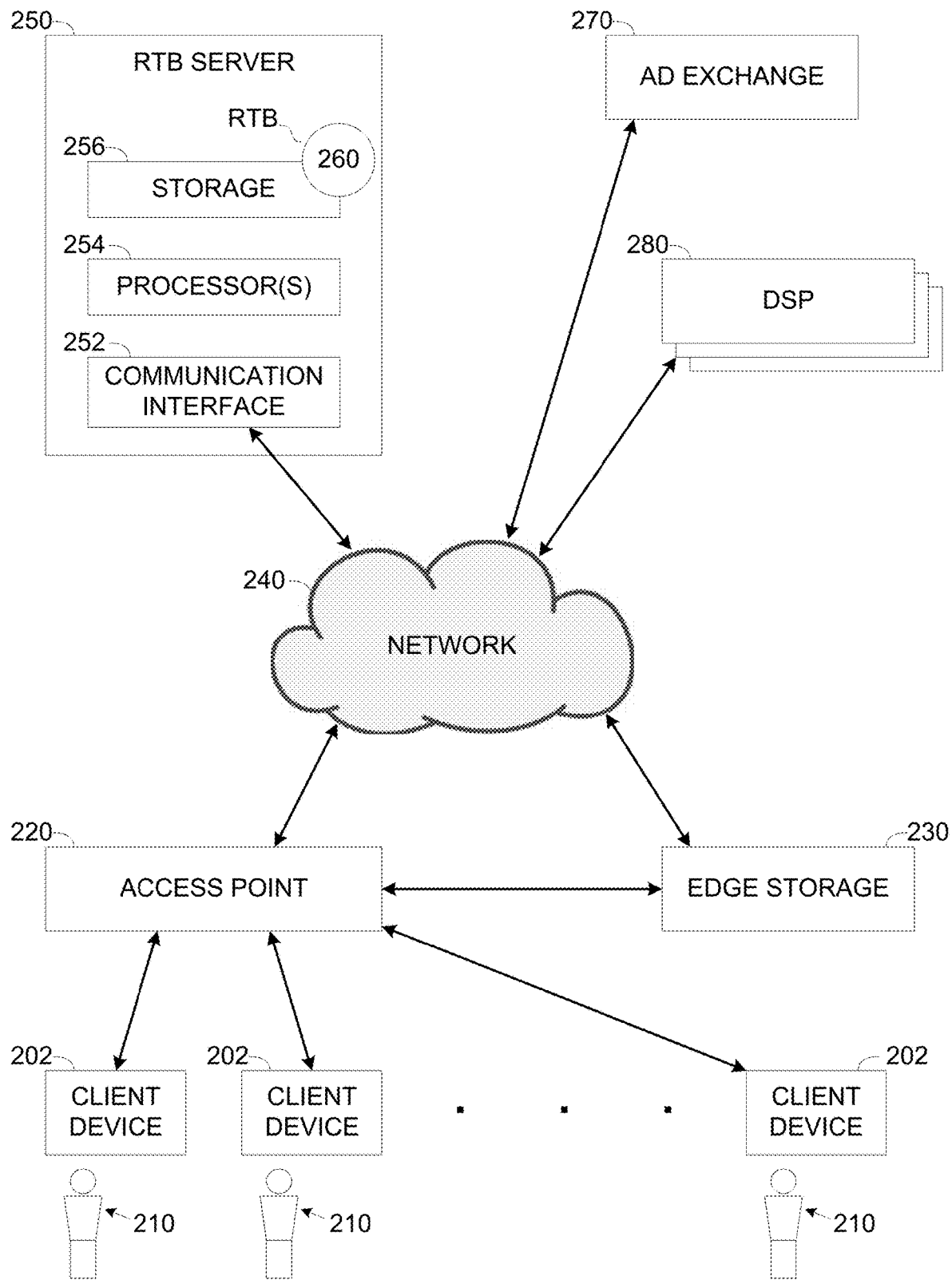
FIG. 2A, FIG. 2B, FIG. 2C and FIG. 2D are schematic illustrations of exemplary embodiments of a system for serving ADs from edge storage in response to RTB requests received from client devices, according to some embodiments of the present invention.
Figure 2B:
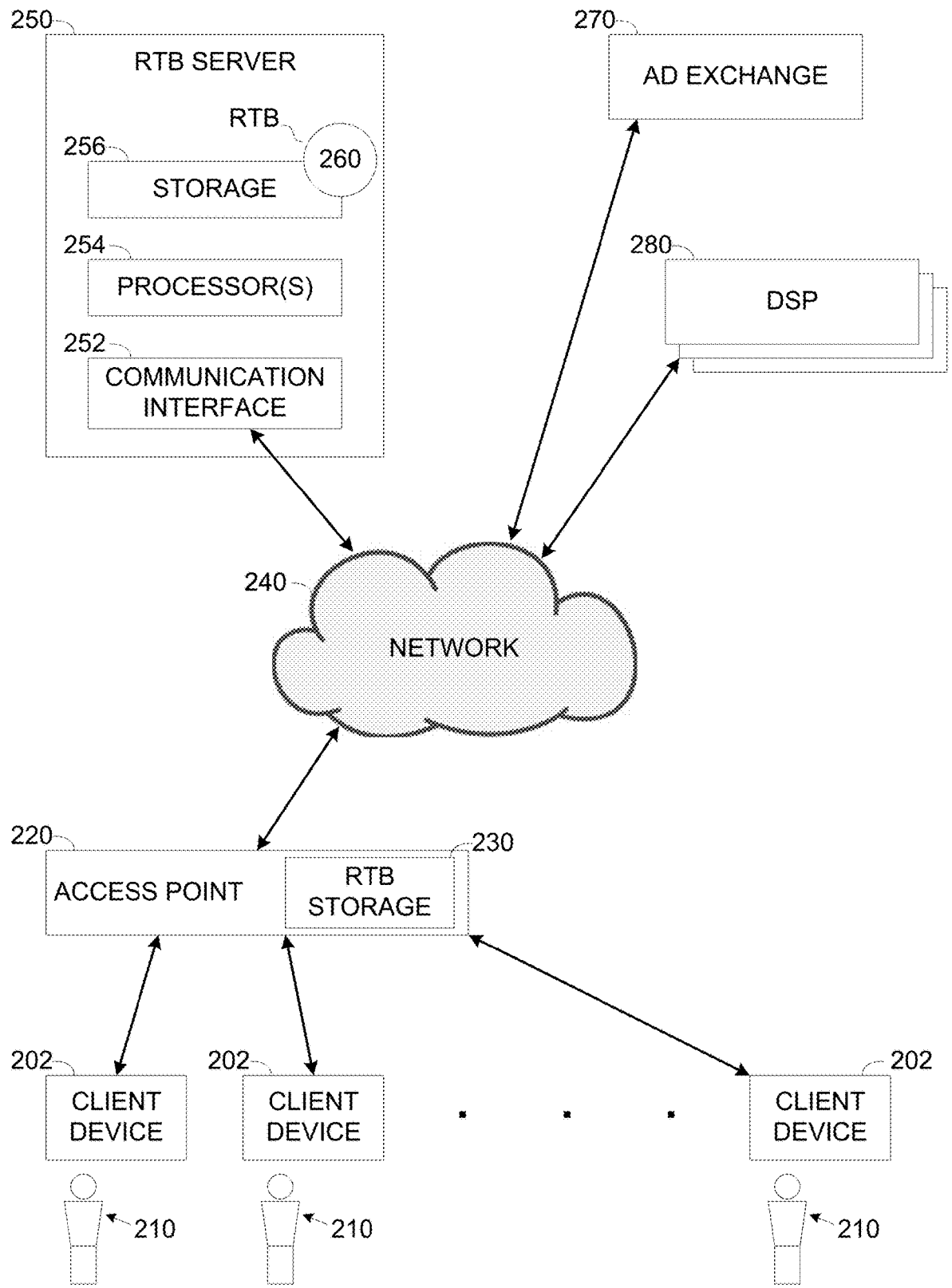
Figure 2C:
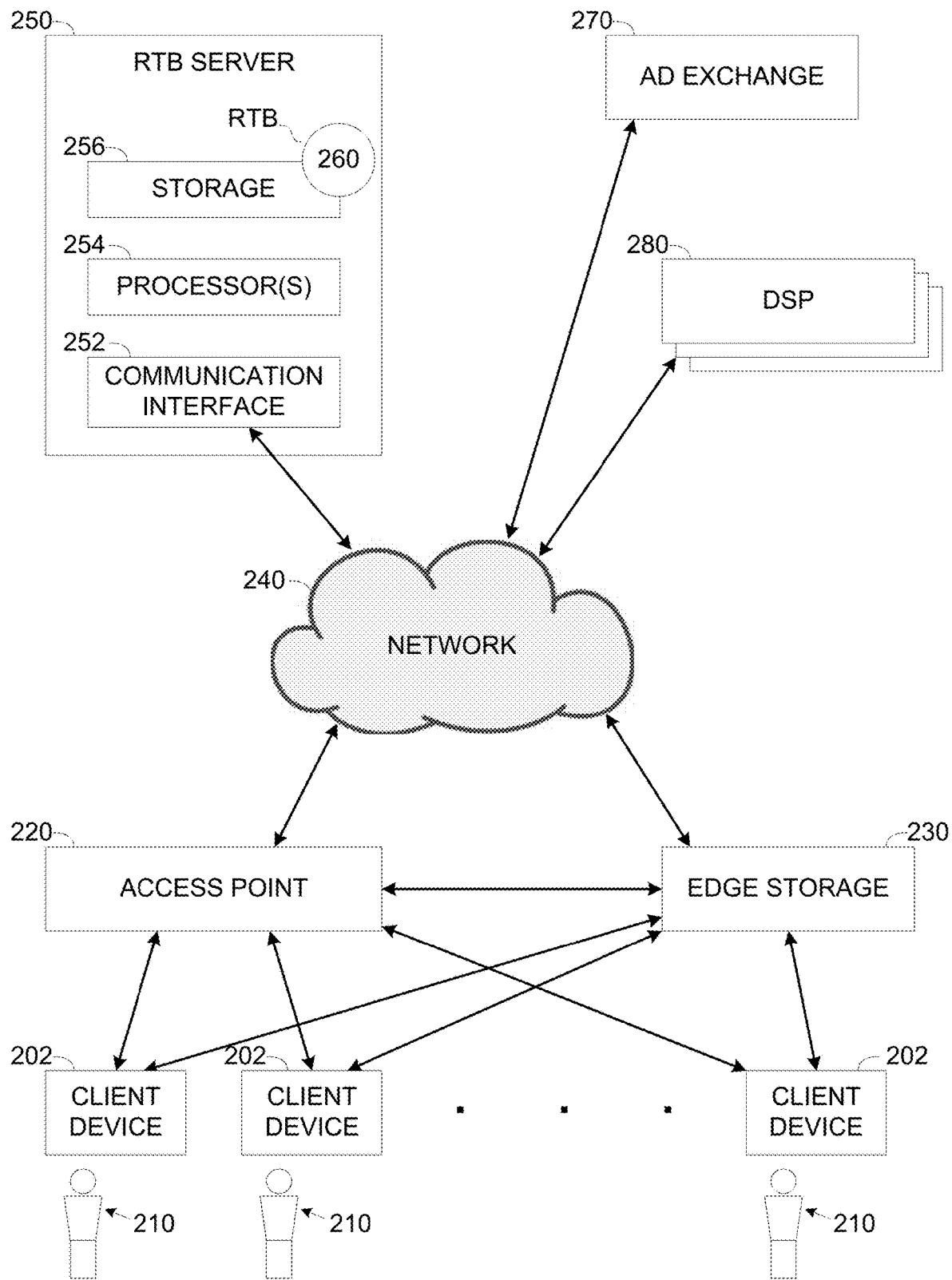

Reference is also made to FIG. 2A, FIG. 2B, FIG. 2C and FIG. 2D, which are schematic illustrations of exemplary embodiments of a system for serving ADs from edge storage in response to RTB requests received from client devices, according to some embodiments of the present invention. As shown in FIG. 2A, FIG. 2B and FIG. 2C, one or more client devices 202, for example, a Smartphone, a tablet, a laptop, a desktop, a smart watch, smart glasses and/or the like associated with respective users 210 may connect to a network 240, for example, a Local area Network (LAN), a Wireless LAN (WLAN), a Wide Area Network (WAN), a Municipal Area Network (MAN), a cellular network, the internet and/or the like through one or more access points 220, for example, a router, a switch, a cellular base station and/or the like providing network connectivity to the client device(s) 202.

Figure 2D:
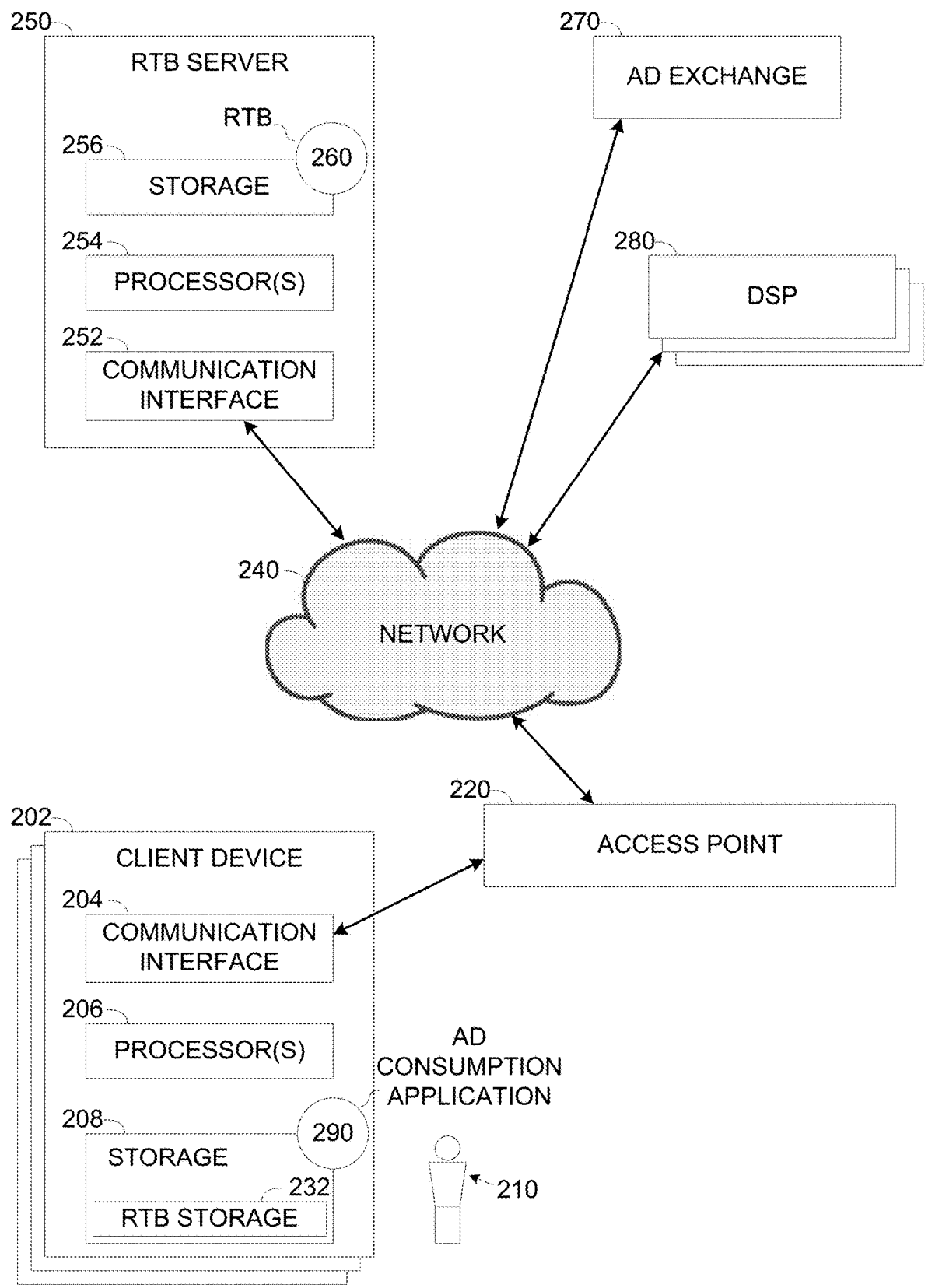

As shown in FIG. 2D, each of the client devices 202 may comprise a communication interface 204, a processor(s) 206 and storage 208 for storing program code and/or data. The client device 202 may typically further comprise a user interface, for example, a keyboard, a pointing device, a display, a touch screen, an audio interface, a tactile interface and/or the like. The communication interface 204 may include one or more wired and/or wireless network interfaces for connecting to the network 240. The processor(s) 206, homogenous or heterogeneous, may include one or more processing nodes arranged for parallel processing, as clusters and/or as one or more multi core processor(s). The storage 208 may include one or more non-transitory memory devices, either persistent non-volatile devices, for example, a Read Only Memory (ROM), a Flash array, a hard drive, a solid state drive (SSD), a magnetic disk and/or the like and/or one or more volatile devices, for example, a Random Access Memory (RAM) device, a cache memory and/or the like. The processor(s) 206 may execute one or more software modules such as, for example, a process, a script, an application, an agent, a utility, a tool and/or the like each comprising a plurality of program instructions stored in a non-transitory medium (program store) such as the storage 208 and executed by one or more processors such as the processor(s) 206.

One or more of the client devices 202 having network connectivity may execute one or more an AD consumption applications 290 presenting to the respective user(s) 210 online content provided by one or more publishers. The online content may embed one or more AD placements for posting visual ADs (e.g. images, video clips, drawings, symbols, etc.), audible ADs (e.g. audio playbacks, etc.) and/or a combination thereof. For example, one or more of the client devices 202 may execute a web browser executing a webpage embedding one or more AD placements. In another example, one or more of the client devices 202 may execute one or more mobile applications embedding one or more AD placements. The AD placements may include AD spaces for posting visual ADs (e.g. images, video clips, drawings, symbols, etc.), audible ADs (e.g. audio playbacks, etc.) and/or a combination thereof.

One or more of the client devices 202 may issue one or more RTB requests, triggered by the publisher(s)'s online content, offering for sale one or more impressions at one or more of the AD placements. The RTB requests may be received by one or more RTB servers 250, for example, a server, a processing node comprising one or more processors, a cluster of processing nodes and/or the like.

The RTB server 250 may include a communication interface 252, a processor(s) 254 for executing a process such as the process 100 and storage 256 for storing program code and/or data. The communication interface 252 may include one or more wired and/or wireless network interfaces for connecting to the network 240. The processor(s) 254, homogenous or heterogeneous, may include one or more processing nodes arranged for parallel processing, as clusters and/or as one or more multi core processor(s). The storage 256 may include one or more non-transitory memory devices, either persistent non-volatile devices, for example, a ROM, a Flash array, a hard drive, an SSD, a magnetic disk and/or the like and/or one or more volatile devices, for example, a RAM device, a cache memory and/or the like. The storage 256 may further comprise one or more network storage resources, for example, a storage server, a network accessible storage (NAS), a network drive, a cloud storage and/or the like accessible via the network 240.

The processor(s) 254 may execute one or more software modules such as, for example, a process, a script, an application, an agent, a utility, a tool and/or the like each comprising a plurality of program instructions stored in a non-transitory medium (program store) such as the storage 214 and executed by one or more processors such as the processor(s) 254. For example, the processor(s) 254 may execute an RTB application 260 to receive and handle one or more of the RTB requests transmitted by the client device(s) 202 and initiate service of the ADs to the client device(s) 202.

The RTB application 260 may forward the RTB requests to one or more AD exchanges 270 which is an automated platform for managing the trade for the AD impressions between a plurality of publishers providing the online content and offering for sale the impressions (at the AD placements) and a plurality of advertisers looking to purchase the AD impressions for posting one or more of a plurality of ADs at the respective AD placements. To support real-time trading of the AD impressions, the AD exchange(s) 270 typically communicates with automated platforms associated with the publishers, for example, supply side platforms (SSPs) and/or the like and automated platforms associated with the advertisers, for example, demand side platforms (DSPs) 280 and/or the like.

Optionally, the RTB server 250 is implemented, integrated and/or utilized by one or more of the SSPs such that the SSP(s) may execute the RTB application 260.

Optionally, the RTB server 250 and/or the RTB application 260 executed by the RTB server 250 are implemented as one or more cloud computing services, for example, Infrastructure as a Service (IaaS), Platform as a Service (PaaS), Software as a Service (SaaS) and/or the like such as, for example, Amazon Web Service (AWS), Google Cloud, Microsoft Azure and/or the like.

One or more edge storage devices 230, for example, a storage media (e.g. a hard drive, etc.), a storage server, a NAS and/or the like may be deployed at the edge of the network 240 where the client devices 202 connect to the network 240. The edge storage device(s) 230 may locally store online media in particular cached ADs which are preloaded in advance to the edge storage device(s) 230 and may be served to the client device(s) 202. Since the edge storage device(s) 230 are deployed in close networking proximity to the client devices 202, i.e. near the access point of the client device(s) 202 to the network 240, the network resources required for communication between the edge storage device(s) 230 and the client device(s) 202 may typically be negligible. Moreover the latency for serving the cached AD(s) from the edge storage device(s) 230 to the client device(s) 202 may be significantly low.

According to some embodiments of the present invention, as shown in FIG. 2A, to support loading of the cached AD(s), one or more of the edge storage devices 230 connect to the access point 220 providing network connectivity for one or more of the client devices 202. Typically, one or more of the edge storage devices 230 connects to the network 240 through the access point 220. However, one or more of the edge storage devices 230 may connect to the network 230 through one or more different network connections. For example, while the access point 220 may be a cellular access point, for example, a base station, a node B, an evolved Node B (eNB) and/or the like providing cellular service to the client device(s) 202, one or more of the edge storage devices 230 may connect to the network 240 through one or more separate networks, for example, a LAN, a WAN and/or the like. Loading the cached AD(s) to the edge storage device(s) 230 may therefore be done through the access point 220 and/or through the other (different) network connection(s).

According to some embodiments of the present invention, as shown in FIG. 2B, one or more of the edge storage devices 230 are integrated, managed, accessed and/or controlled by the access point 220 providing network connectivity for one or more of the client devices 202. Loading the cached AD(s) to the edge storage device(s) 230 may typically be done through and/or by the access point 220.

According to some embodiments of the present invention, as shown in FIG. 2C, one or more of the edge storage devices 230 may include networking capabilities and may directly communicate with one or more of the client devices 202 in parallel to their communication path with the access point 220. The edge storage device(s) 230 may typically communicate with one or more of the client devices 202 via one or more networks separated from the network(s) used by the client device(s) 202 connect to the access point 220. For example, the access point 220 may be a cellular access point, for example, a base station, a node B, an eNB and/or the like providing cellular service for the client device(s) 202 to support connectivity to the network 240. One or more of the edge storage device(s) 230 may communicate with one or more of the client device(s) 202 over one or more WLAN networks, for example, Wi-Fi and/or the like. Similarly to the deployment presented in FIG. 2A, to support loading the cached AD(s), the edge storage device(s) 230 may connect to the network 240 through the access point 220 and/or through the separate network(s).

According to some embodiments of the present invention, as shown in FIG. 2D, one or more of the client devices 202 may host an RTB storage 232 in their local storage 208 for storing (caching) one or more of the cached ADs. The AD consumption application(s) 290 executed by the processor(s) 206 may have access to data stored in the RTB storage 232. For example, the AD consumption application(s) 290 may directly access the storage 208 to retrieve data, specifically ADs from the RTB storage 232. In another example, one or more software modules, for example, an RTB storage application, service and/or the like may be adapted to retrieve the ADs from the RTB storage 232. In such case the AD consumption application(s) 290 may interact with the RTB storage application using, for example, a system call, an Application Programming Interface (API) function of the edge storage application and/or the like in order to obtain data from the RTB storage 232. For example, a certain application installed on a certain client device 202 may perform as the RTB storage application by allocating some of its storage space on the certain client device 202 as RTB storage 232 for storing one or more cached ADs. The AD consumption application(s) 290 may obtain one or more of the cached ADs from the certain application using one or more API functions provided by the certain application.

The embodiments presented in FIG. 2A, FIG. 2B, FIG. 2C and FIG. 2D are exemplary and should not be construed as limiting since other deployments may be constructed. Moreover, two or more of the deployments presented in FIG. 2A, FIG. 2B and FIG. 2C may be combined. For example, one or more of the edge storage devices 230 may be integrated in the access point 220 as shown in FIG. 2B while directly communicating with the client device(s) 202 as shown in FIG. 2C.

As shown at 102, the process 100 starts with the RTB application 260 preloading a subset of ADs selected from a plurality of ADs available from a plurality of advertisers to one or more edge storage devices 230. The selected ADs are thus cached ADs available for local service to one or more of the client devices 202. Preloading the cached ADs may significantly reduce the cost of the network resources, for example, bandwidth, latency and/or the like required for downloading the ADs to the client device(s) 202. This may be of particular interest in case of large venues in which many users 210 are located at the same time in a certain location deployed with a network infrastructure comprising one or more of the access point(s) 220 having a given network capacity for communicating with the network 240. The given network capacity may present a bottleneck between the client devices 202 and remote network resources connected to the network 240, for example, remote server(s), cloud service(s), cloud storage and/or the like from which online content, in particular online content embedding AD(s) is served to the client devices 202 for presentation to the users 210.

It is naturally highly desirable to effectively target the ADs for the user(s) 210 in order to increase visibility, conversion rate and/or the like. The RTB application 260 may therefore select ADs determined as most effective, relevant and/or appropriate for the user(s) 210 and load them to the edge storage device(s) 230 to be cached ADs. Effectively targeting the user(s) 210 may be done by identifying one or more future events in which one or more user(s) 210 are estimated to participate, selecting ADs estimated to best target the participating user(s) 210 and preloading the selected ADs to the edge storage device(s) 230 in advance, i.e. loading the selected ADs prior to the time the future event(s) starts. The process of selecting the ADs and preloading them to be cached ADs in the edge storage device(s) 230 is described herein after in process 300.

As shown at 104, the RTB application 260 may receive one or more RTB requests offering for sale impressions at one or more AD placements embedded in online media presented by one or more of the client devices 202 to their associated user(s) 210. Typically, one or more of the RTB requests include one or more user attributes of the user 210 associated with the client device 202 which issued the respective RTB request. The user attributes may include, for example, attribute(s) of the client devices 202, a personal attribute of the user 210, a parameter of a service level agreement (SLA) of the associated client device(s) 202, a browsing history of the user 210, an online AD consumption history of the user 210 and/or the like. The attributes of the associated client device(s) 202 may include for example, communication and/or networking capabilities (e.g. network connectivity capability (Wi-Fi, 3G, 4G, etc.), bandwidth capacity, etc.), computing and/or memory capabilities (e.g. processor(s) type, processor(s) speed, memory capacity, etc.), display capabilities (e.g. size, resolution, etc.) and/or the like. The personal attributes of the user(s) 210 may include for example, a gender, an age, an ethnic orientation, a residence address and/or the like.

As shown at 106, the RTB application 260 forwards the RTB requests to one or more of the AD exchanges 270. Optionally the RTB application 260 forwards the RTB requests to one or more aggregators of publishers, for example, an SSP which in turn forwards the RTB requests to the AD exchange 270. The AD exchange(s) 270 may conduct a bidding process for the RTB request(s) and receive from one or more of the DSPs 280 bid offers for a respective one of the offered impressions. Each of the bid offers is associated with a respective AD and offers a price to be paid by the advertiser in case the respective AD is converted, for example, viewed by the respective user 210, clicked by the respective user 210, the respective user 210 makes a purchase of the service and/or product offered by the AD and/or the like. One or more of the advertisers, specifically their associated DSP(s) 280 may select to bid for ADs which are estimated to best target the user 210 based on analysis of the user attributes.

As shown at 108, the RTB application 260 receives from the AD exchange(s) 270 the bid offers originally received from the DSP(s) 280.

As shown at 110, the RTB application 260 may identify in real-time whether one or more of the ADs associated with the received bid offers are cached ADs locally stored in the edge storage device(s) 230. The RTB application 260 may maintain a cached ADs record, for example, a list, a table and/or the like listing the cached ADs, i.e. the ADs selected and loaded to one or more of the edge storage devices 230 as described herein after in the process 300. The RTB application 260 may check the cached ADs record to detect whether one or more of the ADs associated with the received bid offers are cached AD locally stored in the edge storage device(s) 230.

As shown at 112, in case the RTB application 260 identifies that one or more of the ADs associated with the received bid offers are non-cached ADs, the RTB application 260 may adjust the bid offers associated with these non-cached ADs to reflect the cost of network resources required to download the non-cached ADs from their origin remote network location(s). Specifically, the RTB application 260 may deduct the cost of the network resources from the price offered by each bid offer to reflect the actual potential income to the advertiser that will result from selecting the respective bid offer and assuming the AD associated with the respective bid offer will be converted.

It should be noted that the price offered by the advertiser in the bid offer may typically be first modified by the RTB application 260 to reflect a probability estimated by the RTB application 260 that the AD associated with the bid offer will be actually converted. For example, assuming the price offered by a certain advertiser in a certain bid offer for a certain AD is $1.0 and further assuming the RTB application 260 estimates that the probability that the certain AD will be converted is 1/20. In such case the RTB application 260 may modify the original price offered by the advertiser to reflect the estimated probability and the actual price used by the RTB application 260 is therefore $1.0/20=$0.05 ($cent 5). The price offered by the bid offers as referenced herein after therefore relates to the price after modified by the RTB application 260 according to the estimated conversion probability.

The cost of back-haul network resources, i.e. the cost of network resources required for exchanging data between the edge storage device(s) 230 or the access point 220 and the client device(s) 202 is typically negligible. The cost of network resources required to serve the cached ADs to the client device(s) 202 is therefore practically negligible since the cached ADs are locally stored in the edge storage device(s) 230 and do not need to be downloaded from their respective origin remote network location(s). Even if not negligible the path between the edge storage device(s) 230 or the access point 220 and the client device(s) 202 is similar for both non-cached ADs and the cached ADs. The RTB application 260 therefore adjusts the bid offers associated with the non-cached ADs to reflect the cost of front-haul network resources, i.e. the cost of network resources required for downloading the non-cached ADs from their respective origin remote network location(s) to the access point 220.

Therefore, in case all the received bid offers are associated with cached ADs, the RTB application 260 does not adjust the bid offers. This is because since all bid offers related to cached ADs that are locally stored in the edge storage device(s) 230, no front-haul network resources are required for downloading the cached ADs and therefore the cost for such front-haul network resources is not applicable. In such case the RTB application 260 simply selects the highest bid offer among the received bid offers which are all associated with cached ADs.

The cost of the network resources required for downloading each of the non-cached ADs is directly dependent on the size of the AD since the larger the size of the AD more network bandwidth may be required for downloading the AD and hence the cost of network resources increases. The cost may further depend on the type of the respective non-cached AD, for example, a picture, a video clip, an audio playback and/or the like. Different network resources costs may apply to different media types and hence to the cost may depend on the type of the respective non-cached AD. The cost may also depend on availability of the respective non-cached AD, for example, a location of the origin remote network location(s), a cost of traffic over the path from the origin remote network location(s) and/or the like.

For each RTB request, the RTB application 260 adjusts the bid offers associated with the non-cached ADs to reflect the cost of the network resources required for downloading the respective ADs based on the size of the respective ADs. The RTB application 260 may then select the AD associated with the highest bid offer offering the highest price (after modified to reflect the conversion probability) for the respective impression among the adjusted bid offers and the bid offers associated with the cached ADs.

Selecting the highest bid offer for each RTB request may be regarded as an optimization problem for selecting the bid offer with the highest price offer. In one embodiment the optimization problem is solved by applying multi-objective optimization over multiple criteria, specifically the size of each of the ADs and the cost of the (front-haul) network resources. The RTB application 260 application may therefore calculate a Pareto frontier for the bid offers corresponding to each of the RTB request in order to select the highest bid offer.

Optionally, before calculating the Pareto frontier, the RTB application 260 discards (from the candidates considered for selection) one or more dominated bid offers associated with non-cached ADs which are dominated by one or more dominant bid offers. A dominant bid offer offers a higher price with respect to the dominated bid offer(s) and is associated with a non-cached AD smaller in size compared to the ADs associated with the dominated bid offer(s). The dominant bid offer therefore dominates the dominated bid offer(s) since after adjusting the bid offers, the price of the dominated bid offer(s) will essentially be lower because they offered a lower price in the first place and may be subject to higher cost of network resources since they are associated with AD(s) larger in size.

Following is an example in which the RTB application 260 selects a highest bid offer among four exemplary bid offers. In response to a certain RTB request the RTB application 260 receives the following four bid offers from a certain AD exchange 270. The bid offers are referred to herein after by their identifier, i.e. their BidID.

The RTB application 260 may identify that the AD associated with BidID 62 is a cached AD stored in the edge storage device(s) 230 while the other three bid offers BidID 69, BidID 67 and BidID 196 are associated with non-cached ADs. Since the AD associated with BidID 62 is a cached AD, the RTB application 260 may regard this AD to have a size of 0 MB (Mega Byte) since this AD does not need to be downloaded from an origin remote network location and therefore no cost is inflicted for delivering this AD to one or more of the client devices 202. The list of bid offers is therefore as follows:

| BidID | BID Offer Price [$cent] | AD Size [MB] |
|---|---|---|
| 59 | 52 | 1.4 |
| 67 | 49 | 2.0 |
| 196 | 42 | 0.5 |
| 62 | 40 | 0 (Cached) |

The RTB application 260 may identify that BidID 67 is dominated by BidID 59 because the price of BidID 67 is lower than the price of BidID 59 and the AD associated with BidID 67 is larger in size compared to the AD associated with BidID 59. The RTB application 260 may therefore discard BidID 67 from further consideration as follows:

| BidID | BID Offer Price [$cent] | AD Size [MB] |
|---|---|---|
| 59 | 52 | 1.4 |
| 196 | 42 | 0.5 |
| 62 | 40 | 0 (Cached) |

The RTB application 260 may then adjust each of the bid offers associated with the non-cached ADs to reflect the cost of their respective required network resources.

In a first example, it is assumed the cost of the network resources is 10 cents per 1 MB, the RTB application 260 may then adjusts the bid offers as follows:

| BidID | BID Offer Price [$cent] | AD Size [MB] | Adjusted BID Offer Price [$ cent] |
|---|---|---|---|
| 59 | 52 | 1.4 | 52 − 1.4*10 = 38 |
| 196 | 42 | 0.5 | 42 − 0.5*10 = 37 |
| 62 | 40 | 0 (Cached) | 40 − 0*10 = 40 |

In this case the RTB application 260 may select the bid offer BidID 62 which is associated with the cached AD since it presents the highest price after the adjustment.

In a second example, it is assumed the cost of the network resources is 5 cents per 1 MB, the RTB application 260 may then adjusts the bid offers as follows:

| BidID | BID Offer Price [$cent] | AD Size [MB] | Adjusted BID Offer Price [$ cent] |
|---|---|---|---|
| 59 | 52 | 1.4 | 52 − 1.4*5 = 45 |
| 196 | 42 | 0.5 | 42 − 0.5*5 = 39.5 |
| 62 | 40 | 0 (Cached) | 40 − 0*5 = 40 |

In this case the RTB application 260 may select the bid offer BidID 59 presenting the highest price after the adjustment.

The cost of the network resources is typically very dynamic and may change momentarily. The RTB application 260 may monitor the variations in the network resources cost and adapt the adjustment and optimization process, for example, the Pareto frontier calculation accordingly.

As shown at 114, for each RTB request the RTB application 260 initiates service of the AD associated with the highest bid offer to the client device 202 which issued the respective RTB request.

In case the AD associated with the highest bid offer is a cached AD, the RTB application 260 initiates service of the AD to the respective client device 202 from the edge storage device 230. Otherwise, in case the AD associated with the highest bid offer is a non-cached AD, the RTB application 260 initiates service of the AD to the respective client device 202 from the origin remote network location(s) of the non-cached AD.

The RTB application 260 may provide a location indicator (e.g. a link, an address, etc.) to the AD associated with the highest bid offer to the client device 202 which issued the respective RTB request to serve the AD to the client device 202. In case the AD is a cached AD served from the edge storage device(s) 230 or from the RTB storage 232, the RTB application 260 may obtain the location indicator from the cached ADs record listing the cached ADs and potentially their access path (e.g. link, address, etc.). Serving the cached ADs is transparent to the user(s) 210 since no degradation is inflicted to the user experience of the user(s) 210 presented with the served cached ADs. In practice the user experience may potentially be improved since the latency for delivering the cached ADs from the edge storage device(s) 230 may be significantly lower compared to the latency of serving a similar AD from its origin remote network location.

In order to adapt the RTB application 260 to operate with legacy and existing RTB platforms one or more mechanisms may be implemented for notifying the RTB platform that the cached ADs are locally available at the edge storage device(s) 230. For example, the RTB application 260 may use a Traffic Detection Function (TDF) to mark relevant communication data streams going to the RTB platform with additional information (variable) indicating that cached ADs are available at the edge storage device(s) 230. The publishers of the online content (e.g. CNN, etc.) may identify the indication in the data streams to become aware of availability of relevant ADs among the cached ADs. Similarly, one or more of the advertisers, specifically their respective DSP(s) 280 may identify that cached ADs are available. Moreover, the DSP(s) 280 may identify the type of the cached ADs, their size and the price offer associated with the cached ADs. Based on the cached ADS information, the DSP(s) 280 may place multiple bid offers for multiple ADs of different size, with different prices and/or a combination thereof in order to be selected (win) for service to the client device(s) 202.

As evident from the process 100, the higher the cost of the network resources (opportunity cost) the higher the probability that cached ADs are selected for service to the client device(s) 202. Given a certain bandwidth, the RTB application 260 may manipulate network resources cost to optimize bandwidth utilization over the front-haul network.

Figure 3:
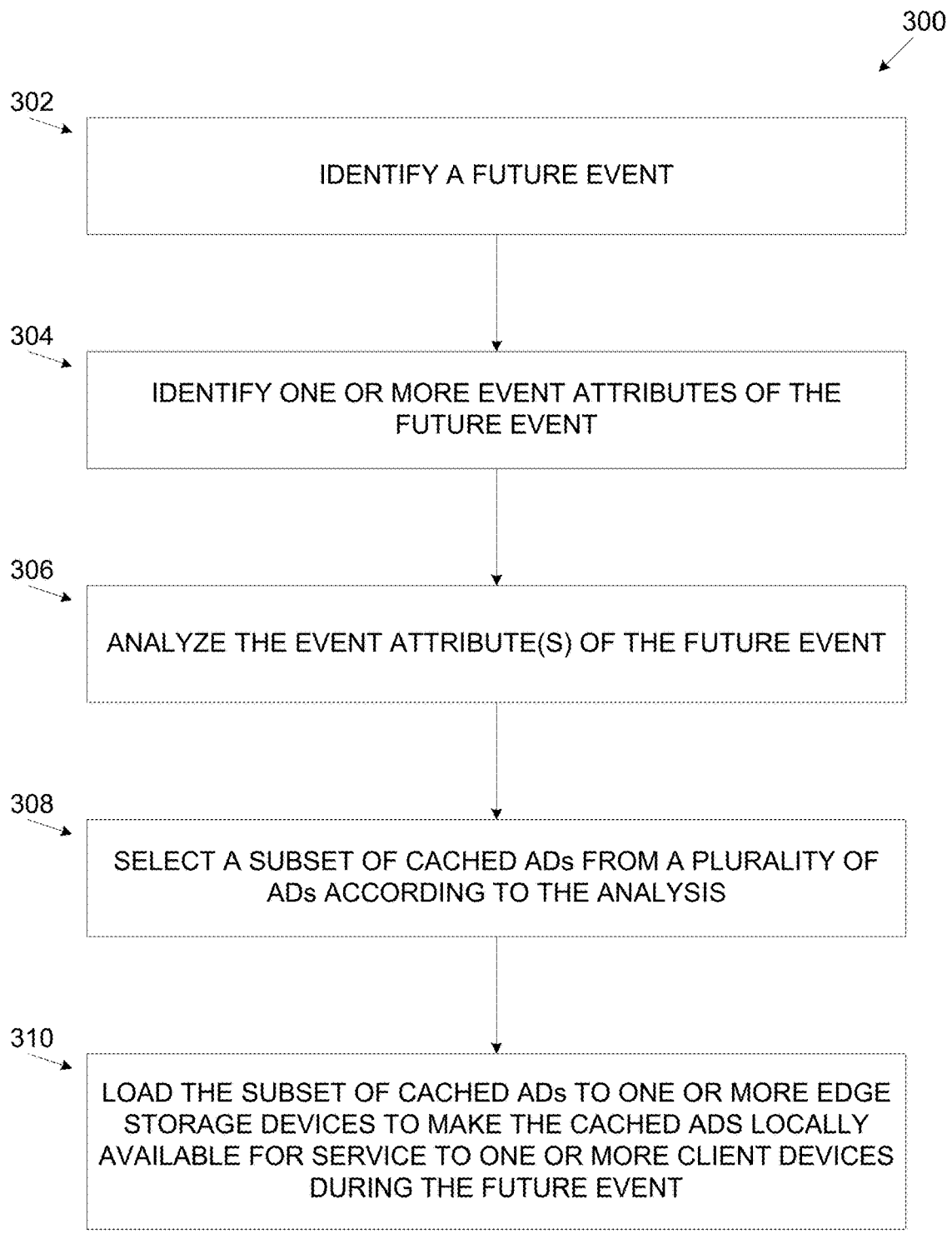
FIG. 3 is a flowchart of an exemplary process of preloading cached ADs to edge storage, according to some embodiments of the present invention.

Reference is now made to FIG. 3, which is a flowchart of an exemplary process of preloading cached ADs to edge storage, according to some embodiments of the present invention. An exemplary process 300 may be executed by an RTB application such as the RTB application 260 executed by an RTB server such as the RTB server 250 to effectively select a subset of a ADs estimated to best target one or more users such as the user 210 estimated to participate in one or more future events at one or more geographical locations. The RTB application 260 may then preload (cache) the selected ADs to one or more edge storage devices 230 located at the edge of a network such as the network 240 in close network proximity to an access point such as the access point 220 which provides network connectivity to one or more client devices such as the client device 202 located in the certain location(s) of the future event(s). The preloaded ADs which are cached in the edge storage device(s) 230 may therefore be locally available at the edge storage device(s) 230 for service to one or more of the users 210 participating in the future event(s).

Selecting and preloading the cached ADs may be done by another software module which may communicate with the RTB application 260, however for brevity the process 300 is described to be executed by the RTB application 300. Moreover, the process 300 is described for a single future event associated with a single edge storage device 230 however this should not be construed as limiting as the process 300 may be applied for preloading cached ADs for a plurality of future events each associated with a plurality of edge storage devices 230.

As shown at 302, the process 300 starts with the RTB application 260 identifying a future event expected to take place in a future time at a certain geographical location.

The future event may be a public event, in particular, a large venue in which multiple users 210 are expected to participate, for example, a sports event, a concert, a movie, a theater show, a happening, a gathering and/or the like. The RTB application 260 may identify one or more such public future events planned to take place in a future time by analyzing online content relating to the future events, for example, schedules, publications, announcements, commercials, promotions and/or the like. Optionally, indication of one or more public future events may be manually provided by one or more users, operators, administrators and/or the like which are authorized to interact with the RTB application 260.

The RTB application 260 may further detect and/or estimate one or more users 210 that are expected to participate in the future event by analyzing attendance information relating to the future event. For example, assuming the future event is a basketball game, a music concert, a movie and/or the like, the RTB application 260 may analyze ticket purchasing records, season ticket subscription records and/or the like to identify one or more users 210 who purchased a ticket for the future event. In another example, assuming the future event is a public gathering (e.g. a festival, a happening, a birthday party, etc.), the RTB application 260 may analyze social media information relating to the gathering, for example, a Facebook page and/or the like to identify one or more users 210 who stated their attendance in the gathering, one or more users 210 who "liked" the page and/or the publication and/or the like.

The future event may further be a private event relating to a single user 210 or a small group of users 210. For example, one or more users 210 driving in a car in a certain geographical area may be expected to arrive at a certain geographical location at a certain future time. The RTB application 260 may detect the user(s) 210 driving in the car by detecting, for example, a certain access point 220 the client device(s) 202 of the user(s) 210 is connected to, for example, a certain base station. The RTB application 260 may estimate that based on the route of the car, the user(s) 210 may arrive at the certain geographical location in a future time, for example, in 15 minutes.

As shown at 304, the RTB application 260 identifies one or more event attributes of the future event. The event attributes may include one or more attributes of the future event itself, for example, a type of the future event, a geographical location of the future event, a timing of the future event, a number of users 210 estimated to participate in the future event and/or the like. As described herein above the RTB application 260 may identify the attributes of the future event by analyzing online content and/or receiving manual input relating to the future event. The type of the future event may be, for example, a sports event, a concert, a movie, a theater show, a happening, a gathering, a certain user(s) 210 being at a certain location and/or the like. The geographical location of the future event may define a specific location in which the future event is planned to take place, for example, a city, a neighborhood, a town, a theater, a stadium, a park, a specific geographical location and/or the like. The geographical location of the future event may define a specific location in which the future event is planned to take place, for example, a city, a neighborhood, a town, a theater, a stadium, a park, a specific geographical location and/or the like. The timing of the future event may include, for example, a date, a time of day, duration and/or the like of the future event. The timing of the future event may further indicate whether the future event is planned to take place before and/or after another future event.

Analyzing the online content and/or the manual input, the RTB application 260 may identify further attributes of the future event which may more accurately describe the future event. For example, in case the identified future event is a sports event, the RTB application 260 may further identify a sport branch of the future sports event, for example, a basketball game, a soccer match, an athletic competition and/or the like. In another example, assuming the identified future event is a music concert, the RTB application 260 may further identify a style and/or a genre of the future music concert event, for example, a rock concert, a classical music concert, a jazz festival and/or the like. In another example, assuming the identified future event is a movie, the RTB application 260 may further identify a genre the future movie event, for example, an action movie, a science fiction movie, a drama movie, a children movie, a documentary movie and/or the like.

The event attributes may also include one or more user attributes of the user(s) 210 estimated to participate in the future event, for example, an attribute of the client device(s) 202 associated with the user(s) 210, a personal attribute of the user(s) 210, a parameter of an SLA of the associated client device(s) 202, a browsing history of the user(s) 210, an online AD consumption history of the user(s) 210 and/or the like. The RTB application 260 may identify the user attributes using one or more methods. For example, the RTB application 260 may detect the type of applications installed and/or used at the client device 202 of one or more of the users 210 estimated to participate in the future event in order to identify personal attribute(s) of the user(s) 250. In another example, the RTB application 260 may analyze one or more cookies installed on the client device 202 of the user(s) 210 estimated to participate in the future event. In another example, the RTB application 260 may analyze browsing history of the user(s) 210 by analyzing the history of a browser application used at the respective client devices(s) 202. In another example, the RTB application 260 may analyze data available from one or more task management applications, calendars and/or the like to identify events, tasks and/or the like indicative of one or more of the user attributes.

As shown at 306, the RTB application 260 analyzes the event attributes of the future event to estimate, predict and/or identify one or more characteristics of the user(s) 210 estimated to participate in the future event, for example, an occupation, an interest, a hobby and/or the like. Based on the analysis, the RTB application 260 may further estimate common characteristics shared by multiple users 210 estimated to participate in the future event, for example, an age group, an ethnic orientation, an interest and/or the like.

As shown at 308, the RTB application 260 selects a subset of ADs from a plurality of ADs available from a plurality of advertisers according to the analysis of the event attribute(s).

For example, assuming the future event is a sports event, for example, a soccer match. Based on the analysis, the RTB application 260 may evaluate that one or more of the users 210 estimated to participate in the soccer match may be fans of the teams playing in the soccer match and may be interested in merchandize items related to these teams. The RTB application 260 may therefore select one or more ADs advertising such merchandize items. Moreover, based on the analysis the RTB application 260 may further identify that the soccer match takes place at evening and may estimate that at least some of the users 210 estimated to participate in the soccer match may wish to have dinner after the soccer match ends. The RTB application 260 may therefore select one or more ADs advertising one or more restaurants. Specifically based on the analysis the RTB application 260 may identify the location where the soccer match is planned to take place, for example, a certain stadium and may select one or more ADs advertising one or more restaurants located in proximity to the certain stadium.

In another example, assuming the future event is a music event, for example, a rock concert, based on the analysis the RTB application 260 may evaluate that a large group of the users 210 estimated to participate in the rock concert are in the ages of 25-35. The RTB application 260 may therefore select one or more ADs estimated to best target this group age, for example, ADs advertising a dating application, ADs advertising a dance club and/or the like.

In another example, assuming the future event is the private event in which one or more users 210 drive in a car in a certain geographical area and expected to arrive at a certain geographical location in a future time, for example, in 15 minutes, in 30 minutes and/or the like. In such case, the RTB application 260 may select one or more ADs advertising one or more attractions, services and/or facilities located in proximity to the certain geographical location, for example, a restaurant, a gas station, a hotel and/or the like. Further assuming the user(s) 210 is expected to arrive at the certain geographical location during the evening, the RTB application 260 may select one or more ADs advertising attractions, services and/or facilities which are relevant to the evening time, for example, a restaurant, a hotel and/or the like.

In another example, assuming that based on the analysis of the browsing history of one or more of the user(s) 210 estimated to participate in the future event, the RTB application 260 determines that the respective user(s) 210 has visited websites relating to one or more certain services, products and/or the like. In such case the RTB application 260 may select one or more ADs advertising the certain service(s) and/or product(s) the user(s) 210 was interested in, ADs advertising similar service(s) and/or product(s), ADs advertising complementary service(s) and/or product(s) and/or the like.

In another example, assuming that based on the analysis of the AD consumption history of one or more of the user(s) 210 estimated to participate in the future event the RTB application 260 determines that the respective user(s) 210 has clicked and/or purchased one of more services, products and/or the like after presented with respective ADs. In such case the RTB application 260 may select one or more ADs advertising the service(s) and/or product(s) relating to the service(s) and/or product(s) the user(s) 210 showed interest in and/or purchased in the past.

In another example, assuming that based on the analysis of the attributes of one or more client device(s) 202 associated with user(s) 210 estimated to participate in the future event the RTB application 260 determines that the SLA of the user(s) 210 is limited to a relatively small bandwidth. In such case the RTB application 260 may select one or more ADs having a relatively large size to make these ADs locally available for service to the user(s) 210 thus avoiding the need for excessive bandwidth which may be required for downloading these ADs from their origin remote network location(s).

Optionally the RTB application 260 selects one or more ADs according to a to a prediction of availability and cost of networking resources required to download at least some of the plurality of ADs to the client device(s) 202 of the user(s) 210 estimated to participate in the future event. For example, assuming the RTB application 260 estimates that networking resources will be limited during the future event and hence the cost of the networking resources may significantly high. In such case the RTB application 260 may select one or more ADs which are large in size and may thus require extensive networking resources for downloading these ADs from their origin remote network location(s).

Optionally the RTB application 260 selects one or more ADs based on analysis of online AD consumption detected during one or more previous events. For example, assuming the future event is a football match. Based on analysis of AD consumption detected during one or more football matches, the RTB application 260 determines that a high AD consumption was registered for ADs advertising utility vehicles (UV). In such case the RTB application 260 may select one or more ADs advertising UV(s), advertising service(s) for UVs and/or the like. In another example, assuming the future event is a baby breast feeding seminar. Based on analysis of AD consumption detected during one or more previous baby breast feeding seminars and/or sessions of the seminar, the RTB application 260 determines that a high AD consumption was registered for ADs advertising baby food. In such case the RTB application 260 may select one or more ADs advertising baby food, advertising shop(s) selling baby food and/or the like.

Optionally the RTB application 260 selects one or more ADs according to a relation of one or more of the advertisers to the future event. For example, assuming a certain company is sponsoring a certain future event, the RTB application 260 may select one or more ADs advertising service(s) and/or product(s) offered by the certain company. In another example, assuming a certain institution, for example, a college is hosting a chess tournament future event, the RTB application 260 may select one or more ADs relating to the certain college advertising, for example, degree study possibilities, scholarships, dormitory options and/or the like. In another example, assuming a certain hi-tech company is organizing a science competition future event, the RTB application 260 may select one or more ADs relating to the certain hi-tech company advertising service(s) and/or product(s) offered by the certain hi-tech company. This may provide an advantage for preferred advertiser(s) (related to the future event) over other advertisers by selecting and preloading AD(s) of the preferred advertiser(s) to the edge storage device 230.

Optionally the RTB application 260 selects one or more ADs according to a storage capacity of the edge storage device 230. The RTB application 260 may apply an optimization analysis to determine a best utilization of the storage capacity of the edge storage device 230 with respect to various subsets of the plurality of ADs available from the advertisers. By selecting the ADs according to the available storage space (capacity) of the edge storage device 230, the RTB application 260 may optimize the available storage space with respect to the ADs selected to be cached by preloading them to the edge storage device 230. For example, assuming the storage capacity of the edge storage device 230 is significantly limited the RTB application 260 may select a reduced subset of ADs consuming a reduced storage space. The RTB application 260 may typically select ADs estimated to best target the user(s) 210 estimated to participate in the future event and may hence are estimated to have a high visibility and/or conversion rate. In contrast, assuming the storage capacity of the edge storage device 230 is significantly large the RTB application 260 may select an increased subset of ADs consuming relatively large storage space. In addition to selecting ADs estimated to best target the user(s) 210 estimated to participate in the future event, the RTB application 260 may select additional ADs which may be estimated to have lesser relevance to the user(s) 210.

Optionally the RTB application 260 selects one or more ADs according to a prediction of which mobile applications will be executed by one or more of the client devices 202 associated with one or more of the users 210 estimated to participate in the future event. By predicting one or more applications, for example, a social media application, a music playing application, a navigation application and/or the like the RTB application 260 may select one or more ADs which are estimated to best target the user(s) 210. For example, assuming the RTB application 260 estimates that one or more social media applications (e.g. Facebook, Instagram, YouTube, etc.) will be used during the future event by one or more users 210 estimated to participate in the future event. In such case, the RTB application 260 may select one or more ADs which are estimated to have high visibility and conversion rate in the social media application(s). The RTB application 260 may further select one or more of the ADs according to an AD consumption history recorded for the social media application(s). The RTB application 260 may therefore select one or more of the ADs that presented high visibility and/or conversion rate in the past when posted in the social media application(s).

Optionally the RTB application 260 selects one or more ADs according to one or more parameters of one or more of the plurality of ADs offered by the advertisers. The AD parameters may include for example, a type of a respective AD, an availability of the respective AD, a size of the respective AD and/or the like. By selecting the ADs to be cached in the edge storage device 230 according to their parameters, the RTB application 260 may select ADs which are estimated to best target the user(s) 210 estimated to participate in the future event. For example, assuming the RTB application 260 identifies that the future event is a rock concert, the RTB application 260 may select one or more ADs according to their type. Since typically rock concerts are extremely noisy making it impossible to hear audible ADs and/or video clips, the RTB application 260 may select one or more visual ADs presenting an image, a drawing, a symbol and/or the like while avoiding selection of audible ADs and/or video clips. In another example, assuming the RTB application 260 may prefer to select one or more large sized ADs to make them locally available from the edge storage device 230 thus reducing and potentially avoiding the costs and/or latency for downloading this AD(s) from their respective origin remote network location(s). In another example, assuming the RTB application 260 identifies that during the future event the origin remote network location(s) of one or more of the ADs may be unavailable and/or heavily accessed, the RTB application 260 may select such ADs for caching at the edge storage device 230.

Optionally the RTB application 260 selects one or more ADs according to an RTB emulation for predicting bid offers associated with at least some of the plurality of ADs available from the advertiser(s). In order to predict the future bid offers, the RTB application 260 may communicate with one or more automated systems and/or platforms of one or more of the advertisers, for example, the DSP 280 and/or the like adapted to emulate bid offers submission for future impressions for posting the associated ADs at a future time. This means that the adapted automated systems and/or platforms of the advertiser(s) may submit bid offers in response to future RTB requests, i.e. RTB requests for a future time. While typically the DSPs 280 are capable of submitting bid offers in real time for purchasing current impressions, one more of the DSPs 280 may be configured, modified and/or adapted to submit one or more bid offers for future impressions of one or more ADs that will be posted in AD placements embedded in online content that will be consumed by the user(s) 210 in the future during the future event. The RTB application 260 may then analyze the bid offers submitted by the DSPs for the future impressions, for example, calculate the Pareto frontier for the bid offers corresponding to each emulated RTB request to adjust the bid offers according to a predicted cost of the network resources. Based on the calculated Pareto frontier, the RTB application 260 may select one or more ADs associated with highest bid offers and cache (preload) them in the edge storage device 230. It is highly probable that ADs associated with highest bid offers as identified during the emulated RTB process will be selected for service to the user(s) 210 during the future event. Therefore, preloading the ADs during network resources low cost periods (prior to the future event) and locally serving these cached ADs from the edge storage device 230 during the future event (during which the network resources may be significantly higher compared to the low cost periods) may significantly increase the advertising income margin.

Optionally, the RTB application 260 conducts the RTB emulation according to one or more of the optional conditions described herein above, for example, AD consumption during one or more previous events, a relation of the advertiser(s) to the future event, a storage capacity of the edge storage device 230, prediction of which application will be executed by the client devices 202 during the future event, the parameter(s) of the AD(s) and/or the like.

Advertisers may be motivated to adapt their DSP(s) 280 to emulate bid offers for future impressions since this may require a relatively minor effort while the ability to emulate future bid offers may significantly improve the probability that AD(s) of the advertiser are preloaded to the edge storage device 230 and may therefore have a higher probability of being served to the user(s) 210 during the future event thus receiving higher visibility and potentially increasing the conversion rate. However, it is possible that one or more of the advertisers may try to mislead the RTB application 260 in order to have the associated AD(s) preloaded to the edge storage device 230. The advertiser(s) may configure their DSP(s) 280 to submit high bid offers for one or more ADs during the bid offer emulation and submit lower bid offers for the same AD(s) during the actual future event. In order to prevent this, the RTB application 260 may apply a mechanism that compares the emulated bid offers submitted during the emulation with the real bid offers submitted during the actual future event in order to capture such fraud attempts. Advertisers detected to conduct such fraud attempts may be warned and possibly inflicted with penalties.

Optionally the RTB application 260 selects one or more ADs according to an RTB simulation of offering for sale a plurality of impressions for posting a plurality of ADs in a plurality of AD placements embedded in online content presented by one or more client device 202 to respective user(s) 210 estimated to participate in the future event. The RTB application 260 may conduct the RTB simulation by offering for sale the impressions at a current time (i.e. prior to the future event) using one or more event attributes identified for the future event. Since it is highly probable that ADs associated with highest bid offers as identified during the simulated RTB process will be selected for service to the user(s) 210 during the future event, locally serving these cached ADs from the edge storage device 230 may significantly increase the income margin since the network resources cost may be significantly reduced.

In order to accurately simulate the RTB process as predicted to take place during the future event, during the RTB simulation the RTB application 260 may generate RTB requests comprising event attributes similar to those of the future event, for example, an event type, an event geographical location and event timing, users attributes of the user(s) 250 estimated to participate in the future event and/or the like. For example, assuming the future event is a certain movie show, the RTB application 260 may conduct the RTB simulation to offer for sale impressions during the same certain movie show. The RTB application 260 may then analyze the bid offers submitted by the DSPs 280 for the impressions, for example, calculate the Pareto frontier for the bid offers corresponding to each simulated RTB request according to the cost of the network resources. Based on the calculated Pareto frontier, the RTB application 260 may select one or more ADs associated with highest bid offers and cache (preload) them in the edge storage device 230. The RTB application 260 may further adjust the RTB process simulation according to the storage capacity (size) of the edge storage device 230 in order to make optimal use of this capacity with respect to the number and/or size of the selected ADs to be cached ADs.

Moreover, the RTB application 260 may conduct the RTB simulation to have one or more timing attributes that are substantially similar to the timing of the future event in order to apply similar network resources costs. While it is naturally impossible to conduct the RTB simulation at the exact same time and date as the future, it may be possible for the RTB application 260 to conduct the RTB simulation with similar timing attributes as identified for the future event, for example, same time of day, same day of the week and/or same duration. To continue the previous example, assuming the RTB application 260 identifies the future event is a certain movie show that is planned to take place at 21:00 on Thursday of a following week. The RTB application 260 may conduct the RTB simulation to offer for sale impressions during the same certain movie show taking place at 21:00 on Thursday of a current week. Applying similar event timing attributes during the RTB simulation as are identified for the future event may significantly increase the accuracy of the RTB simulation since the cost of the network resources is expected to be significantly similar to the network resources cost during the future event.

Furthermore, the RTB application 260 may conduct the RTB simulation according to one or more of the optional conditions described herein above, for example, AD consumption during one or more previous events, a relation of the advertiser(s) to the future event, a storage capacity of the edge storage device 230, prediction of which application will be executed by the client devices 202 during the future event, the parameter(s) of the AD(s) and/or the like.

Optionally the RTB application 260 adjusts one or more of the selected ADs to reflect a timing of the future event. Since the ADs are selected and cached (preloaded) in the edge storage device 230 prior to a time of the future event, some content of some of the selected ADs may need to be adjusted to reflect the time of the future event which is the time when the selected AD(s) may be actually served to the client device(s) 202 for presentation to the associated user(s) 210 participating in the future event. For example, assuming a certain AD selected for caching in the edge storage device 230 advertises a certain fashion store and includes a banner stating that a grand opening of certain fashion store will take place in 10 days. Further assuming that the RTB application 260 selects the certain AD for storage at the edge storage device 230 for a certain future event planned to take place in 2 days. In such case the RTB application 260 may adjust the banner of the certain AD to state that the grand opening of certain fashion store will take place in 8 days.

As shown at 310, the RTB application 260 preloads the subset of selected ADs to the edge storage device 230 thus making the selected ADs cached ADs locally stored by the edge storage device 230 located in close network proximity to the access point 220 providing network connectivity to client device(s) 202 located in the geographical area of the future event. The cached ADs may be available for service during the future event to one or more of the client devices 202 associated with respective user(s) 210 participating in the future event and hence located at the geographical location of the future event. The RTB application 260 may update the cached ADs record(s) to reflect the ADs selected and cached in the edge storage device 230.

Figure 4:
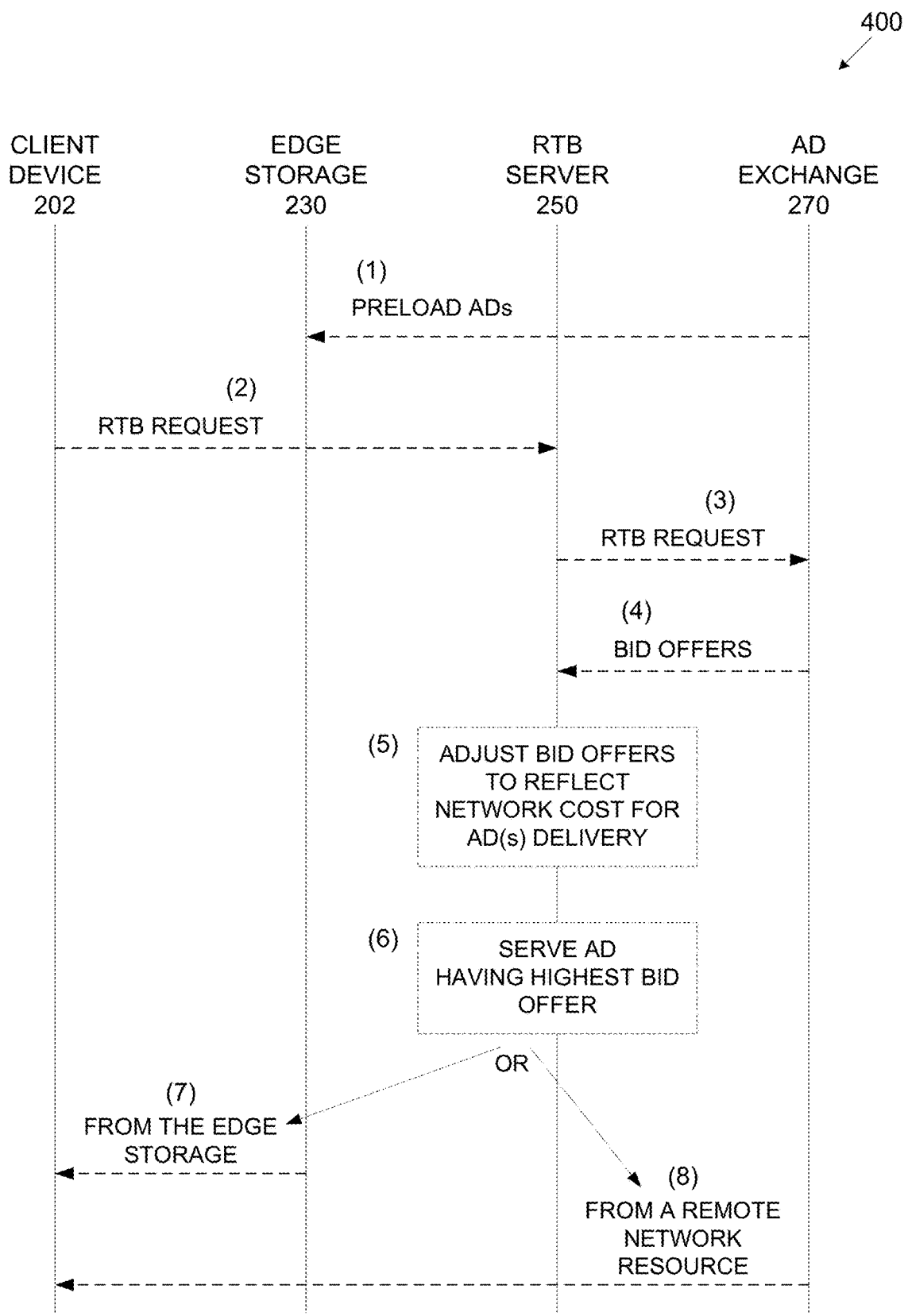
FIG. 4 is a schematic illustration of an exemplary sequence of serving ADs from edge storage in response to RTB requests received from client devices, according to some embodiments of the present invention.

Reference is now made to FIG. 4, which is a schematic illustration of an exemplary sequence of serving ADs from edge storage in response to RTB requests received from client devices, according to some embodiments of the present invention. An exemplary sequence 400 presents a sequence of a process such as the process 100 executed by an RTB application such as the RTB application 260 for serving ADs to one or more client device such as the client device 202 from one or more edge storage devices such as the edge storage devices 230. As shown by the process 400, the process is preceded by (1) preloading one or more cached ADs to the edge storage devices 230 as described in process 300. An RTB request is received (2) by the RTB application 260 from one of the client devices 202 as described in step 104 of the process 100. The RTB application 260 forwards (3) the RTB request to one or more AD exchanges such as the AD exchange 270 as described in step 106 of the process 100. In return the RTB application 260 receives (4) from the AD exchange(s) 270 a plurality of bid offers corresponding to the RTB request as described in step 108 of the process 100. The RTB application 260 may adjust (5) the bid offers received for non-cached ADs and select a highest bid offer as described in step 112 of the process 100. The RTB application 260 may then initiate service (6) of the AD associated with the highest bid offer as described in step 114 of the process 100. In case the highest bid offer is associated with one of the cached ADs, the AD is served from the edge storage device 230 (7), otherwise the non-cached AD associated with the highest bid offer is served from its origin remote network location (8).

It is expected that during the life of a patent maturing from this application many relevant systems, methods and computer programs will be developed and the scope of the terms client device, SSP and DSP are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A computer implemented method of serving Real Time Bidding (RTB) requests received from client devices based on availability of advertisements (ADs) at an edge storage, comprising:

using at least one processor of an RTB server, the at least one processor performs:
receiving, via a network, at least one RTB request from at least one client device for an impression in at least one AD placement offered by online content presented by the at least one client device to an associated user;
forwarding the at least one RTB request to at least one AD exchange;
receiving from the at least one AD exchange a plurality of bid offers received from a plurality of advertisers for purchasing the impression to post a plurality of ADs;
identifying in real-time at least one of the plurality of ADs is a cached AD stored at the edge storage located at an edge of the network serving the at least one client device;
for each non-cached AD of the plurality of ADs, determining a monetary cost of network resource usage required for downloading the non-cached AD to the at least one client device;
calculating a Pareto frontier for the plurality of bid offers according to the monetary cost and a size of each of the plurality of non-cached ADs;
reducing each of the plurality of bid offers relating to a respective non-cached AD of the plurality of ADs by the monetary cost determined for downloading the respective non-cached AD to the at least one client device; and
initiating service, to the at least one client device, of at least one AD associated with a highest bid offer among both the plurality of reduced bid offers and a subset of the plurality of bid offers relating to the at least one cached AD;
wherein the at least one cached AD is preloaded to the edge storage based on an RTB simulation which:
identifies a future event including a time of the future event,
identifies users estimated to participate in the future event,
determines a simulation time occurring prior to the time of the future event and similar to the time of the future event whereby a cost of network resources at the simulation time is expected to be similar to a network resources cost during the future event;
at the simulation time, simulates a plurality of RTB requests that include attributes of the users estimated to participate in the future event, the RTB requests corresponding to simulated impressions for AD placement,
receives bid offers responsive to the plurality of simulated RTB requests, the bid offers corresponding to ADs to be presented for the simulated impressions,
selects for preloading to the edge storage a subset of remotely stored ADs corresponding to highest bids of the received bid offers and having a collective size that is within an available capacity of the edge storage, preloads the selected subset of remotely stored ADs to the edge storage prior to the time of the future event, wherein the preloaded selected subset of remotely stored ADs includes the at least one cached AD, and provides to the edge storage a dataset associating each cached AD with at least one of a plurality of user attributes, wherein the dataset comprises a hash table mapping each cached AD of the at least one cached AD to at least one of the plurality of user attributes, wherein the edge storage uses the dataset to determine which of the at least one cached AD is associated with at least one of the plurality of user attributes of the associated user of the at least one client device from which the at least one RTB request was received, and wherein the at least one cached AD that is identified in real-time is identified based on a determination that the at least one cached AD is associated with the at least one of the plurality of user attributes of the associated user of the at least one client device from which the at least one RTB request was received.

2. The method of claim 1, further comprising the RTB request includes the at least one of the plurality of user attributes of the associated user, the at least one of the plurality of user attributes is used by at least one of the plurality of advertisers to calculate a respective one of the plurality of bid offers for a respective one of the plurality of ADs, the at least one of the plurality of user attributes is a member of a group consisting of: an attribute of the at least one client device, a personal attribute of the associated user, a communication parameter of a service level agreement (SLA) of the at least one client device, a browsing history of the associated user and an online AD consumption history of the associated user.

3. The method of claim 1, wherein the monetary cost is calculated based on at least one parameter of the respective non-cached AD which is a member of a group consisting of: a type of the respective AD, an availability of the respective AD, and a size of the respective AD.

4. The method of claim 1, further comprising discarding at least one non-cached AD of the plurality of ADs which is dominated by a non-cached AD of the plurality of ADs having a smaller size and associated with a higher bid price.

5. The method of claim 1, wherein the users estimated to participate in the future event is identified by analyzing attendance information of an attendance of the users estimated to participate in the future event.

6. The method of claim 1, wherein the attributes of the users estimated to participate in the future event include at least one of an attribute of a client device associated with the users, a personal attribute of the users, a parameter of a service level agreement (SLA) of the associated client device, a browsing history of the users and an online AD consumption history of the users.

7. A system for serving Real Time Bidding (RTB) requests received from client devices based on availability of advertisements (ADs) at an edge storage, comprising:

a storage storing a code; and at least one processor of a RTB server coupled to the storage for executing the stored code, the code comprising:

code instructions to receive, via a network, at least one RTB request from at least one client device for an impression in at least one AD placement offered by online content presented by the at least one client device to an associated user;

code instructions to forward the at least one RTB request to at least one AD exchange;

code instructions to receive from the at least one AD exchange a plurality of bid offers received from a plurality of advertisers for purchasing the impression to post a plurality of ADs;

code instructions to identify in real-time at least one of the plurality of ADs is a cached AD stored at the edge storage located at an edge of the network serving the at least one client device;

code instructions to, for each non-cached AD of the plurality of ADs, determine a monetary cost of network resource usage required for downloading the non-cached AD to the at least one client device;

code instructions to calculate a Pareto frontier for the plurality of bid offers according to the monetary cost and a size of each of the plurality of non-cached ADs;

code instructions to reduce each of the plurality of bid offers relating to a respective non-cached AD of the plurality of ADs by the monetary cost determined for downloading the respective non-cached AD to the at least one client device; and code instructions to initiate service, to the at least one client device, of at least one AD associated with a highest bid offer among both the plurality of reduced bid offers and a subset of the plurality of bid offers relating to the at least one cached AD;

wherein the at least one cached AD is preloaded to the edge storage based on an RTB simulation which:

identifies a future event including a time of the future event, identifies users estimated to participate in the future event, determines a simulation time occurring prior to the time of the future event and similar to the time of the future event whereby a cost of network resources at the simulation time is expected to be similar to a network resources cost during the future event;

at the simulation time, simulates a plurality of RTB requests that include attributes of the users estimated to participate in the future event, the RTB requests corresponding to simulated impressions for AD placement, receives bid offers responsive to the plurality of simulated RTB requests, the bid offers corresponding to ADs to be presented for the simulated impressions, and selects for preloading to the edge storage a subset of remotely stored ADs corresponding to highest bids of the received bid offers and having a collective size that is within an available capacity of the edge storage, preloads the selected subset of remotely stored ADs to the edge storage prior to the time of the future event, wherein the preloaded selected subset of remotely stored ADs includes the at least one cached AD, and provides to the edge storage a dataset associating each cached AD with at least one of a plurality of user attributes, wherein the dataset comprises a hash table mapping each cached AD of the at least one cached AD to at least one of the plurality of user attributes, wherein the edge storage uses the dataset to determine which of the at least one cached AD is associated with at least one of the plurality of user attributes of the associated user of the at least one client device from which the at least one RTB request was received, and wherein the at least one cached AD that is identified in real-time is identified based on a determination that the at least one cached AD is associated with the at least one of the plurality of user attributes of the associated user of the at least one client device from which the at least one RTB request was received.

8. A computer implemented method of serving Real Time Bidding (RTB) requests received from a client device based on availability of advertisements (ADs) stored at the client device, comprising:

using at least one processor of an RTB server, the at least one processor performs:
- receiving, via a network, at least one RTB request from at least one client device for an impression in at least one AD placement offered by online content presented by the at least one client device to an associated user;
- forwarding the at least one RTB request to at least one AD exchange;
- receiving from the at least one AD exchange a plurality of bid offers received from a plurality of advertisers for purchasing the impression to post a plurality of ADs;
- identifying in real-time at least one of the plurality of ADs is a cached AD stored at an edge storage located at an edge of the network serving the at least one client device;
- for each non-cached AD of the plurality of ADs, determining a monetary cost of network resource usage required for downloading the non-cached AD to the at least one client device;
- calculating a Pareto frontier for the plurality of bid offers according to the monetary cost and a size of each of the plurality of non-cached ADs;
- reducing each of the plurality of bid offers relating to a respective non-cached AD of the plurality of ADs by the monetary cost determined for downloading the respective non-cached AD to the at least one client device; and
- initiating service, to the at least one client device, of at least one AD associated with a highest bid offer among both the plurality of reduced bid offers and a subset of the plurality of bid offers relating to the at least one cached AD;

wherein the at least one cached AD is preloaded to the edge storage based on an RTB simulation which:
identifies a future event including a time of the future event,
identifies users estimated to participate in the future event,
determines a simulation time occurring prior to the time of the future event and similar to the time of the future event whereby a cost of network resources at the simulation time is expected to be similar to a network resources cost during the future event;
at the simulation time, simulates a plurality of RTB requests that include attributes of the users estimated to participate in the future event, the RTB requests corresponding to simulated impressions for AD placement,
receives bid offers responsive to the plurality of simulated RTB requests, the bid offers corresponding to ADs to be presented for the simulated impressions,
selects for preloading to the edge storage a subset of remotely stored ADs corresponding to highest bids of the received bid offers and having a collective size that is within an available capacity of the edge storage,
preloads the selected subset of remotely stored ADs to the edge storage prior to the time of the future event, wherein the preloaded selected subset of remotely stored ADs includes the at least one cached AD, and
provides to the edge storage a dataset associating each cached AD with at least one of a plurality of user attributes, wherein the dataset comprises a hash table mapping each cached AD of the at least one cached AD to at least one of the plurality of user attributes,
wherein the edge storage uses the dataset to determine which of the at least one cached AD is associated with at least one of the plurality of user attributes of the associated user of the at least one client device from which the at least one RTB request was received, and
wherein the at least one cached AD that is identified in real-time is identified based on a determination that the at least one cached AD is associated with the at least one of the plurality of user attributes of the associated user of the at least one client device from which the at least one RTB request was received.

* * * * *